United States Patent [19]

Fleck et al.

[11] Patent Number: 5,488,404

[45] Date of Patent: Jan. 30, 1996

[54] OPTICAL CHARACTER GENERATOR FOR AN ELECTRO PHOTOGRAPHIC PRINTER

[75] Inventors: Friedrich Fleck, Munich; Klaus-Dieter Jörgens, Baldham, both of Germany

[73] Assignee: Siemens Aktiengesellschaft, Munich, Germany

[21] Appl. No.: 247,507

[22] Filed: May 23, 1994

Related U.S. Application Data

[63] Continuation of Ser. No. 576,394, Sep. 26, 1990, abandoned.

[30] Foreign Application Priority Data

Mar. 11, 1988 [DE] Germany ............................ 38 08 219.5

[51] Int. Cl.⁶ ........................................................ B41J 2/45
[52] U.S. Cl. ........................... 347/238; 347/237; 347/130; 347/132
[58] Field of Search .................................. 346/107R, 154, 346/107 A, 160; 358/302; 395/108; 347/237, 238, 240, 130, 131, 132, 145

[56] References Cited

U.S. PATENT DOCUMENTS 3,952,311 4/1976 Lapeyre .......................... 346/107 R X
4,614,954 9/1986 Ohta et al. ............................... 346/160
4,746,941 5/1988 Pham et al. ............................. 346/154
4,750,010 6/1988 Ayers et al. ......................... 346/107 R Primary Examiner—Benjamin R. Fuller
Assistant Examiner—David Yockey
Attorney, Agent, or Firm—Hill, Steadman & Simpson

[57] ABSTRACT

A plurality of light-emitting diode chips (2) densely packed in the form of rows is associated with driver chips (34) and associated drive chips (3) on both sides. The printing information is supplied from a printer control (6) via a bus system (4, 4' and 5, 5'). Each light-emitting diode chip is subdivided into n groups of light-emitting diodes (for example LED1, LED3, LED5 . . . LED31 and LED98, LED100 . . . LED128), which are arranged geometrically offset with respect to one another transversely to the main direction of the diode row. Each drive chip contains a switching unit (32) for generating internal sequence control signals (for example SWE1, SWE2, I-CLK) and n part-circuits (33/0 to 33/3) associated with the n groups of light-emitting diodes for the simultaneous processing of the printing information into temporally staggered drive signals (DS). Thus, the respective light-emitting diode groups are activated with a temporal offset depending on the geometric offset in order to generate a printed image line which is assembled section by section.

17 Claims, 12 Drawing Sheets

| | | | | | |
|---|---|---|---|---|---|
| tp10 | 11......11 | | | | 11......11... |
| tp11 | 11......11 | | 11......11 | | 11......11... |
| tp12 | 11......11 | 11......11 | 11......11 | | 11......11... |
| tp13 | 11......11 | 11......11 | 11......11 | 11......11 | 11......11... |
| tp20 | 11......11<br>21......21 | 11......11 | 11......11 | 11......11 | 11......11...<br>21......21... |
| tp21 | 11......11<br>21......21 | 11......11 | 11......11<br>21......21 | 11......11 | 11......11...<br>21......21... |
| ... | | | | | |
| tp40 | 11 12 11 12<br>21......21<br>31......31<br>41......41 | 11......11<br>21......21<br>31......31 | 11......11<br>21......21<br>31......31 | 11......11<br>21......21<br>31......31 | 11 12 11 12<br>21......21<br>31......31...<br>41......41... |
| tp41 | 11 12 11 12<br>21......21<br>31......31<br>41......41 | 11......11<br>21......21<br>31......31 | 11 12 11 12<br>21......21<br>31......31<br>41......41 | 11......11<br>21......21<br>31......31 | 11 12 11 12<br>21......21<br>31......31...<br>41......41... |
| ... | | | | | |
| tp43 | 11 12 11 12<br>21......21<br>31......31<br>41......41 | 11 12 11 12<br>21......21<br>31......31<br>41......41 | 11 12 11 12<br>21......21<br>31......31<br>41......41 | 11 12 11 12<br>21......21<br>31......31<br>41......41 | 11 12 11 12<br>21......21<br>31......31...<br>41......41... |

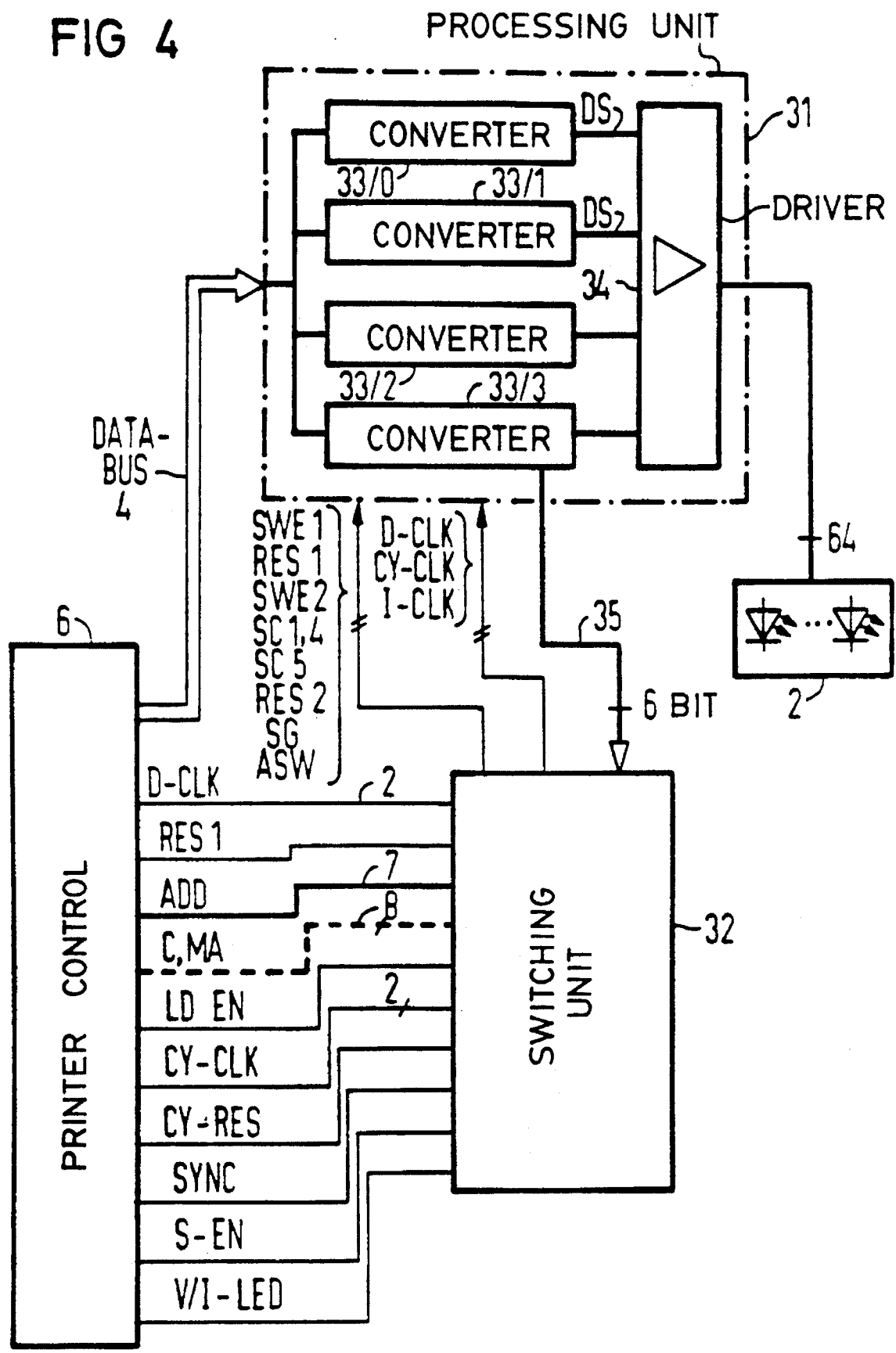

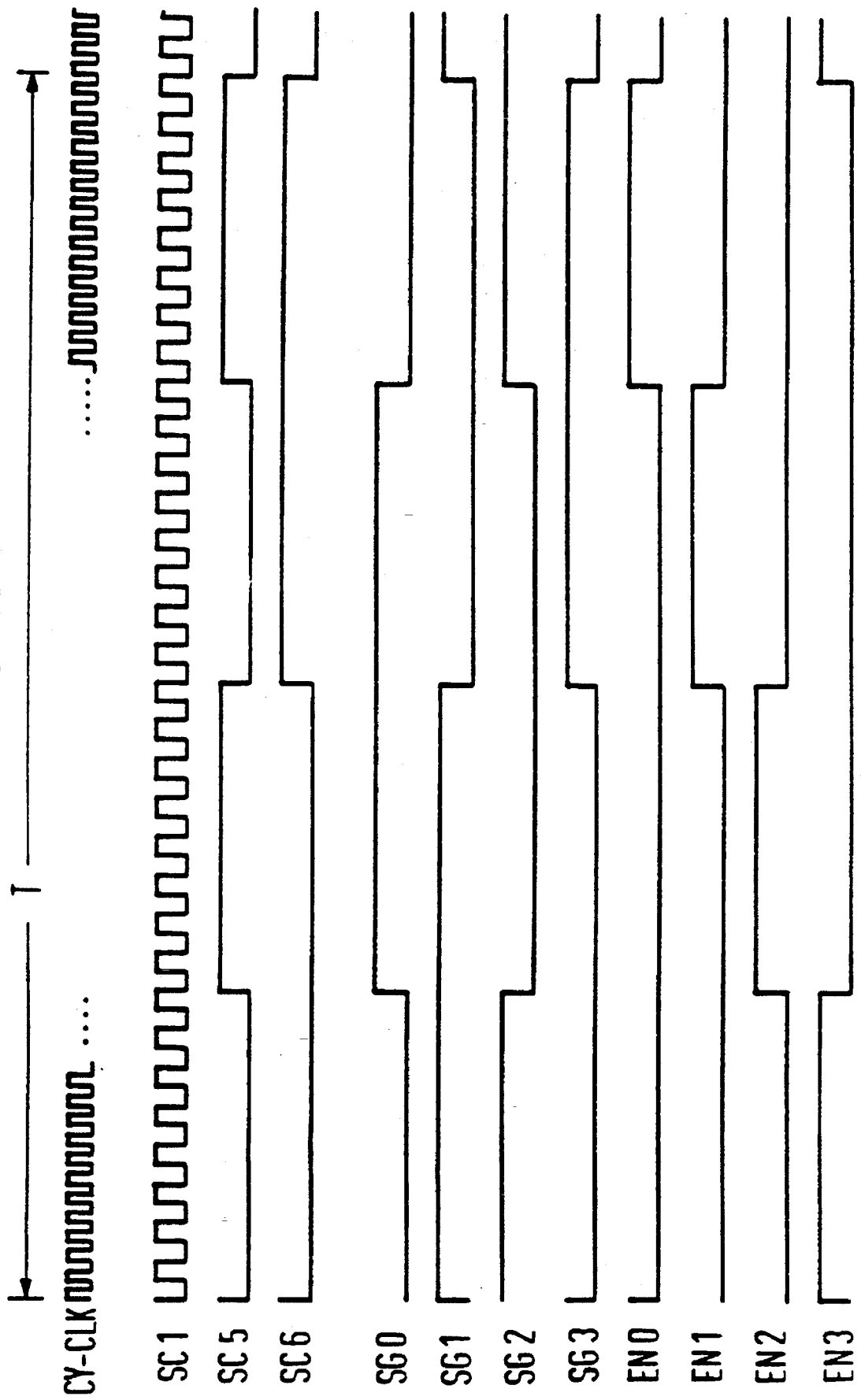

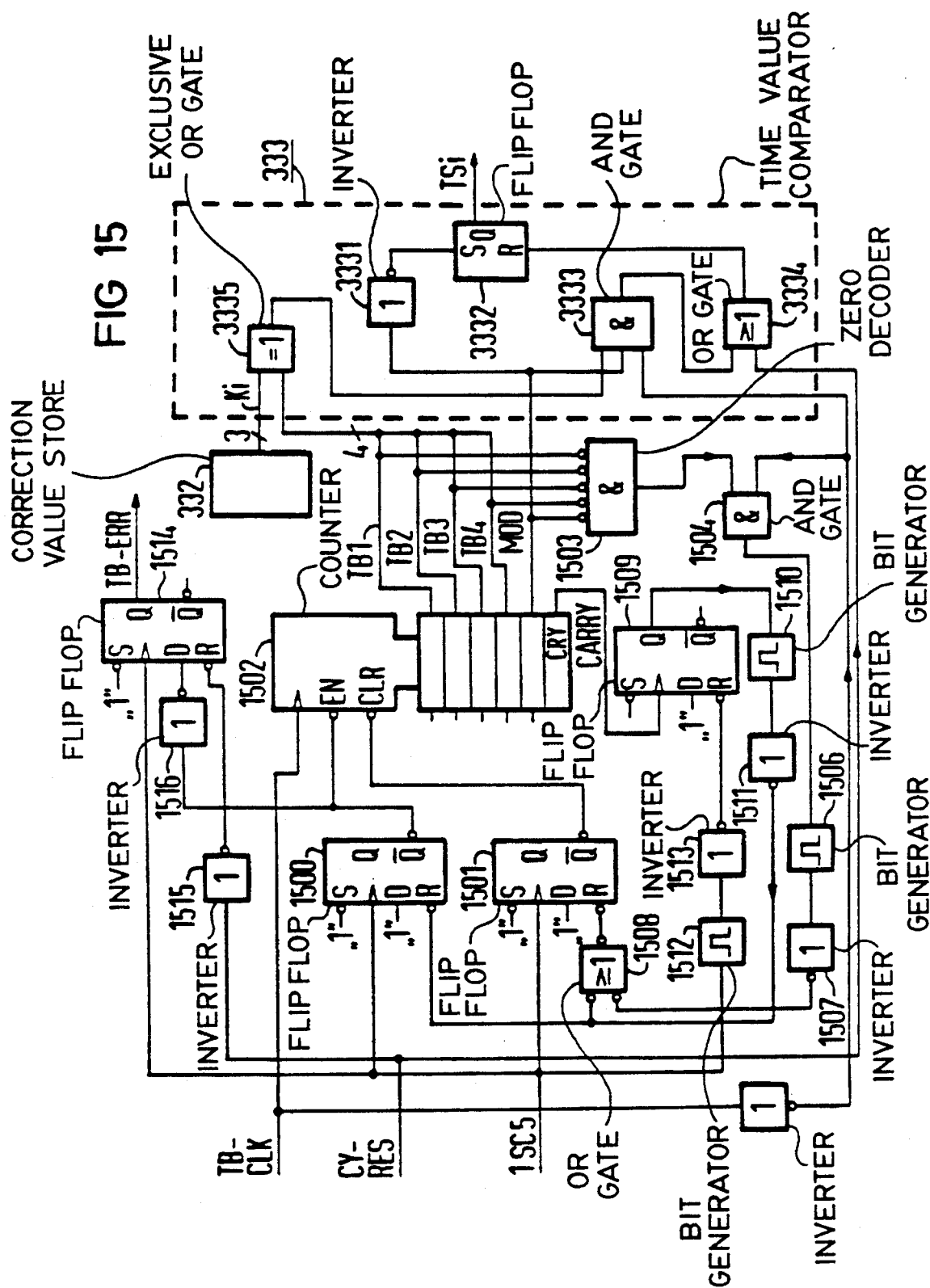

OPTICAL CHARACTER GENERATOR FOR AN ELECTRO PHOTOGRAPHIC PRINTER

This is a continuation of application Ser. No. 576,394, filed Sep. 26, 1990, now abandoned.

BACKGROUND OF THE INVENTION

The invention relates to an optical character generator for an electro photographic printer for generating a charge image on a revolving charge storage drum, the charge image being in the form of micro-image lines generated continuously during in each case one printing cycle. The generator has a plurality of modules arranged in the form of rows, consisting of plurality of light-emitting diode chips having in each case light-emitting diode chips having in each case light-emitting diodes which are in each case arranged row by row underneath one another and which are also offset with respect to one another, of driver chips associated with the latter on both sides and of drive chips connected to the latter for buffer storage and conversion of printing information, serially supplied by a printer control via a bus system, into individual drive signals for the drive chips for selectively switching-on the light-emitting diodes.

Printers operating in accordance with the principle of electrophotography contain an optical character generator. This character generator is used for converting an item of printing information present in the form of electronic data into an optical image by means of which a photoconductive layer, for example a continuously circulating charge storage drum of the printer, is then exposed in order to generate a latent charge image. This charge image is developed in familiar manner and reprinted, for example, on paper.

For this application, optical character generators are of advantage which expose the charge storage drum row-by-row in its full length since the exposure process can then be carried out without any mechanical movement. Such a row-by-row configuration of the optical character generator requires a separate light source for each imaging point within the row. Light-emitting diodes are preferably used as light sources since these components offer the possibility of a very compact arrangement.

The aim of such printers is to achieve a high quality of the printed image. The prerequisite for this is a corresponding resolution, 240 dpi (=dots per inch) and more not being unusual at all for electro photographic printers. An optical character generator constructed in rows for an electro photographic printer therefore contains a plurality of light-emitting diodes, frequently several 1000. The drive system for the light-emitting diodes, which must be individually switched in dependence on the printing information supplied to the optical character generator, is correspondingly complex. From IEEE Transaction on Consumer Electronics, Vol. CE-32, No. 1, February 1986, pages 26 et seq., an optical character generator is known in which a monolithically constructed row of light-emitting diodes is driven via a plurality of drive chips in the form of integrated circuits arranged on both sides of this row of light-emitting diodes. This known optical character generator is designed for applications in electro photographic printers with a printing capacity of about one DIN A4 sheet per second which corresponds to a line frequency of about 3 kHz. This requires a data rate of about 8 Mbit/s, resulting in a data clock frequency of 1 MHz with a total of eight parallel data channels.

Apart from data registers, the drive chips contain an integrated driver circuit comprising a plurality of driver stages which are in each case allocated to one of the light-emitting diodes. The driver circuit has a current source which can be calibrated to the chip and to which the driver stages are connected in parallel. The driver stages are constructed in such a manner that the driver current flowing via the individual stage either activates the associated light-emitting diode or flows away via a ground connection. It is considered to be an advantage of this solution that the entire current loading in the optical character generator remains constant with time independently of the respective printed image.

However, it must be realized that quite considerable currents flow with several 1000 light-emitting diodes and a corresponding number of driver stages in the optical character generator and the total thermal loading is therefore very high with the compact type of construction. Although this thermal loading is kept constant in the main in the known solution, this advantage is gained at the cost of a not inconsiderable proportion of the currents supplied by the current sources being uselessly drained directly via ground which generates further heat which is avoidable per se.

In addition, all driver stages of the known solution are jointly activated via a strobe signal and kept in the active state for a period of this signal. It is known, however, that the light yields of light-emitting diodes are subject to tolerances which means that the radiation energy emitted during a predetermined period of time is an individual value for each light-emitting diode. It follows from this that the radiation energy impinging in image dots on the charge storage drum is different which has a disadvantageous influence on the print quality.

Finally, a multiple of the said line frequency is required for high-speed printers operating in accordance with the electro photographic principle and it should preferably also be possible to process various paper formats. An optical character generator having a line length which corresponds to the transverse format of a DIN A4 page is not adequate for this. In order to print papers in the DIN A3 format, the optical character generator must have at least a line length which corresponds to the length of one longitudinal side of a DIN A4 sheet. Given such constraints, however, the optical character generator can no longer be constructed in accordance with the teachings of the known solution.

From U.S. Pat. No. 4,571,602, a modular optical character generator for an electro photographic line printer is also known the modules of which in each case contain several light-emitting diode chips and the associated drive circuit. To achieve a corresponding resolution of the micro-image dots, the light-emitting diodes are arranged in two rows underneath one another. In this arrangement, the light-emitting diodes of one row are in each case offset with respect to those of the other row by one centre-to-centre distance in the line direction. Thus, the problem exists of synchronizing the drive of the light-emitting diodes of the two light-emitting diode rows which are geometrically offset with respect to one another transversely to the row direction, even though the printing information corresponding to all image dots of a micro-image line is transmitted serially bit by bit in one printing cycle by a printer control.

To solve this problem, each light-emitting diode row is associated with its own shift register chain in which the printing information transferred is stored bit by bit and in cyclic alternation. After the transmission process, one shift register chain contains the printing information for all even-numbered image dots and the other shift register chain contains the printing information for all odd-numbered image dots of one and the same micro-image line. During the subsequent printing process, the printing information is read out in parallel from one of the two shift register chains and transferred directly into driver chips for the light-emitting diodes of one diode row so that by this means, for example, all light-emitting diodes associated with even-numbered image dots are activated simultaneously but individually.

At the same time, the light-emitting diodes of the other diode row associated with the odd-numbered image dots are activated in the same manner. Taking into consideration the geometric offset of the two diode rows with respect to one another, however, the light-emitting diodes of the second diode row are driven on the basis of an item of printing information for a micro-image line the even-numbered image dots of which were already generated a predetermined number of printing cycles before. For this purpose, delay circuits are inserted between the second shift register chain and the driver circuits for the second diode row. In these delay circuits, the transport of information is controlled by a clock signal synchronizing the printing cycle, in such a manner that the printing process occurs at the same time for even-numbered and odd-numbered image dots of two different image lines.

Due to the plurality of driven light-emitting diodes within a short period, this results in a considerable impulsive current loading of the optical character generator in the form of the sum of the driver currents occurring. The mean current loading is proportional to the line length of the optical character generator and inversely proportional to the spacing of the micro-image dots.

Finally, GB-A-2 099 221 describes for such an optical character generator in particular the technology which makes it possible inexpensively and operationally reliably to construct densely packed modules of LED chips and drive and driver chips. Solutions for combating the problem of average current loading in optical character generators with high packing density are not addressed in this context.

SUMMARY OF THE INVENTION

The present invention is therefore based on the object of creating an optical character generator of the type initially described above which is suitable for use in high-capacity printers, that is to say can also be operated at high line frequency with a considerable length of the light-emitting diode row. Apart from an adapted solution for transferring the information to be printed into the character generator, this also requires a minimization of the drive currents flowing in the temporal mean, in order to be able to control in this manner the thermal loading in the character generator.

In an optical character generator of the type mentioned, this object is achieved in accordance with the invention by each light-emitting diode chip for an activation of the light-emitting diodes, which is temporally staggered in the printing cycle, being subdivided into n multi-row light-emitting diode groups which are in each case arranged geometrically offset with respect to one another transversely to the main direction of the diode row. The drive chips have a switching unit for generating internal temporally staggered sequence control signals and n part-circuits in each case associated with one light-emitting diode group and controlled by in each case one of the sequence control signals, for converting the printing information into drive signals which are temporally staggered group by group and the staggering of which in the timing pattern of the printing cycle being dependent on the respective geometric offset of the associated light-emitting diode group so that a charge image line which is linearly assembled section by section is generated on the charge storage drum. In this connection, it is assumed that, although the rate of printing can be increased by increasing the rate of data transmission, the necessary line frequency in printing cannot be achieved by serially loading the drive chips. On the other hand, the maximum on time of the light-emitting diodes is predetermined by the radiation energy required for generating the corresponding charge image on the charge storage drum.

For this reason, a concept deviating from the principle of conventional optical character generators for electro photographic printers is implemented in the solution according to the invention. Firstly, the geometric arrangement of the light-emitting diodes deviates from the strictly linear arrangement. The light-emitting diodes of each light-emitting diode chip are subdivided into several groups, all light-emitting diodes of one group being arranged along one line. The individual groups, however, are arranged to be geometrically offset with respect to one another in the transverse direction to the diode row. This geometric offset makes it possible to generate parts of a microline at different times on the charge storage drum since, in accordance with the assumption, the charge storage drum revolves continuously.

Due to this special geometric arrangement of the light-emitting diodes, the on times of all light-emitting diodes of the optical character generator can be distributed over a relatively long period in the processing cycle. This lowers the mean current loading which, in particular, also leads to a reduced thermal loading when the simultaneously activated groups of light-emitting diodes are distributed in area as uniformly as possible over the entire length of the optical character generator. In addition, this geometry of the arrangement of the light-emitting diodes creates the prerequisite for temporally staggering the processes for transferring the printing information into stores of the drive chips and for deriving drive signals for the drivers of the light-emitting diodes, the switching-on of the light-emitting diodes being completely decoupled from the charging process for the printing information.

This decoupling of the data transfer from the processing of the stored data allows this data processing to be performed in a flexible manner. Thus, the radiation energy emitted by each light-emitting diode can be kept constant by individual drive and on time of each light-emitting diode even though this individual calibration must be performed for a plurality of light-emitting diodes. The temporal staggering of the necessary sequences also provides for suitably short processing cycles in this case, that is to say the required high line frequency. The temporally staggered processing of the data requires an internal timing pattern in the optical character generator. This is achieved by the switching unit provided in each drive chip, which supplies the internal sequence control signals for the temporally staggered sequences in the processing section of the drive chip and ensures the synchronicity of these sequences.

BRIEF DESCRIPTION OF THE DRAWINGS

Further developments of the invention and the significance of these further developments and the advantages achieved by this means are explained in greater detail in the subsequent description of an illustrative embodiment of the invention. This illustrative embodiment is described with reference to the drawing, in which:

FIGS. 3A and 3B show the functioning of the FIG. 2 embodiment of the present invention in producing picture element lines.

FIG. 4 shows a block diagram of a drive chip, constructed of a switching unit and a processing unit comprising a plurality of part-circuits which in each case process the printing information for one of the groups of light-emitting diodes of the associated light-emitting diode chip, FIG. 10 shows a number of timing diagrams of essential sequence control signals generated in the switching unit for one processing cycle, FIG. 15 shows a circuit diagram of a further embodiment in which the sequence control signals processed in the time value comparator according to FIG. 6 are derived from a separate time base clock signal sequence asynchronous with the clock of the processing cycle.

DESCRIPTION OF THE PREFERRED EMBODIMENT

Figure 1:
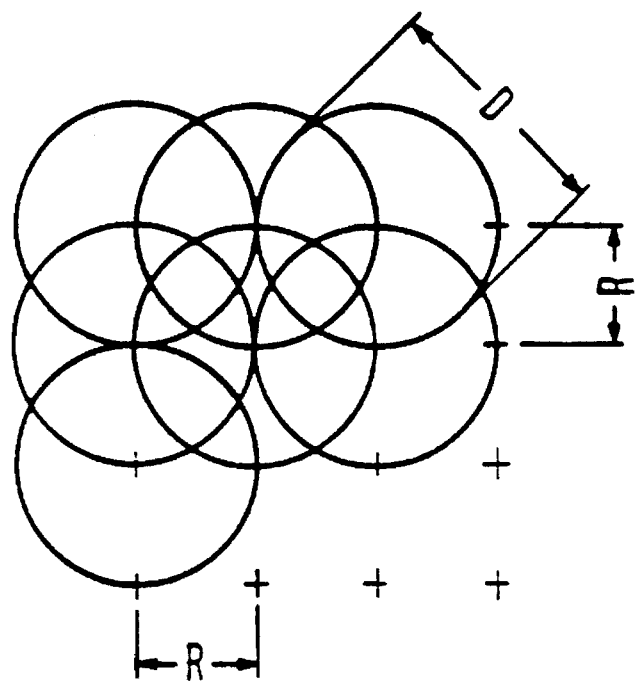
FIG. 1 diagrammatically shows in a section the structure of a printed image matrix with individual image dots of a particular diameter, placed above one another in accordance with a predetermined pattern, FIG. 2 diagrammatically shows the configuration of a light-emitting diode chip as part of a diode strip of the optical character generator comprising individual groups of light-emitting diodes which are geometrically offset with respect to one another in the direction of printing.

A printer operating in accordance with the electro photographic principle, having an optical character generator which exhibits a plurality of individually excitable light-emitting diodes in a row-by-row arrangement is assumed to be known. Such an optical character generator exposes a photoconductor drum of the printer in the manner of a matrix as is indicated diagrammatically in FIG. 1. The pattern of the printed matrix, predetermined by a spacing R, is identical in the line and column direction. The dot diameter D on the photoconductor drum is assumed to correspond to twice the spacing, resulting in the exposed image shown in FIG. 1.

Figure 2:
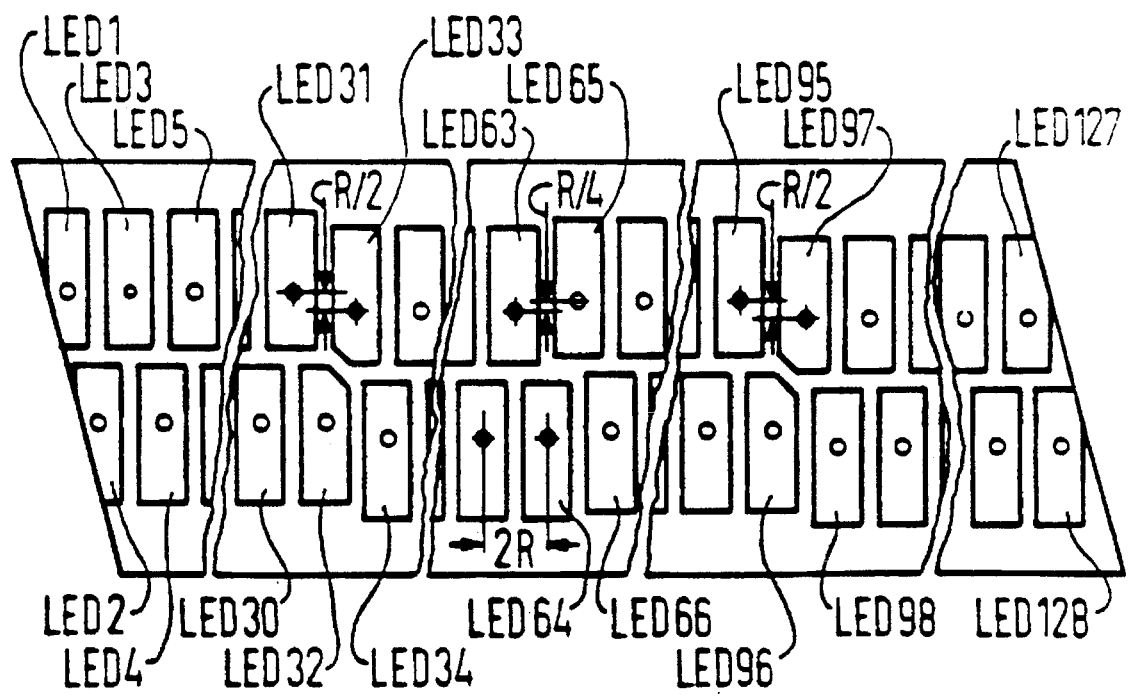

For each matrix dot of a line of the printed matrix, one light-emitting diode LED is available in the optical character generator. FIG. 2 shows the spatial arrangement of the individual elements of a light-emitting diode chip which, together with a plurality of other such chips forms the light-emitting diode strip of the optical character generator. For space reasons, the light-emitting diodes LED1 to LED128 are in each case at a distance which corresponds to twice the spacing R. This necessitates an arrangement of the light-emitting diodes in two rows, the light-emitting diodes of the lower row being arranged offset by one spacing 4R in the direction of the row compared with those of the upper row. To generate the printed image indicated diagrammatically in FIG. 1, first the light-emitting diodes LED1, LED3, LED5, . . . LED127 of the upper diode row are individually excited during a write process so that light dots at the distance of twice the spacing are first transferred to the photoconductor drum in this process. At a later time, the intermediate printed dots are then generated by exciting the light-emitting diodes LED2, LED4 to LED128 of the lower light-emitting diode row.

It must be clarified first that due to the paper formats used, writing widths of, for example, about 432 mm are not unusual in high-speed non-mechanical printers. This means a number of 4080 microdots per line even with a matrix pitch of 240 dpi (=dots per inch), that is to say 32 such diode chips, shown in FIG. 2 are then already needed for the light-emitting diode strip of the optical character generator. A simple rough calculation shows that the number of these chips is increased to at least 80 if a matrix pitch of 600 dpi is aimed for with the same writing width. Such fine patterns, too, are within the range of technical design for non-mechanical high-speed printers in order to generate a printed image the sharpness of which can compete with products of offset printing technology. In this connection, it must also be taken into consideration that, for reasons of tolerance, the width of the actual zone of exposure is even greater than the writing width so that the values specified must here be rounded up.

These numbers, mentioned by way of example, illustrate the drive problem in the optical character generator since each light-emitting diode LED of the light-emitting diode strip must be individually activated during the exposure process for a microline. As can be easily seen, even a mean driver current of 15 mA per light-emitting diode already means a considerable current loading for the entire electronic circuit so that measures must be taken for keeping the total mean loading as low as possible.

For this purpose, the write process for a microline to be written onto the photoconductor is subdivided into several write cycles which are temporally staggered with respect to one another. In the illustrative embodiment selected, four such write cycles are used as a basis as will still be explained in greater detail. In the geometric arrangement of the light-emitting diodes LED1 to LED128 on the diode chip, this is embodied by a division of the light-emitting diodes into four diode blocks with light-emitting diodes LED1 to LED32, LED33 to LED64, LED65 to LED96 and LED97 to LED128, respectively. The photoconductor drum of the non-mechanical printer revolves continuously and the diode blocks are activated temporally staggered in accordance with the assumption which is why the light-emitting diodes of the respective blocks are arranged to be geometrically offset with respect to one another. In this arrangement, the geometric offset is selected in such a manner that the thermal loading resulting from the current loading is also locally uniformly distributed in the temporal mean. For this reason, first the first diode block, then the third, then the second and finally the fourth diode block, seen from left to right, is activated.

Figure 3:
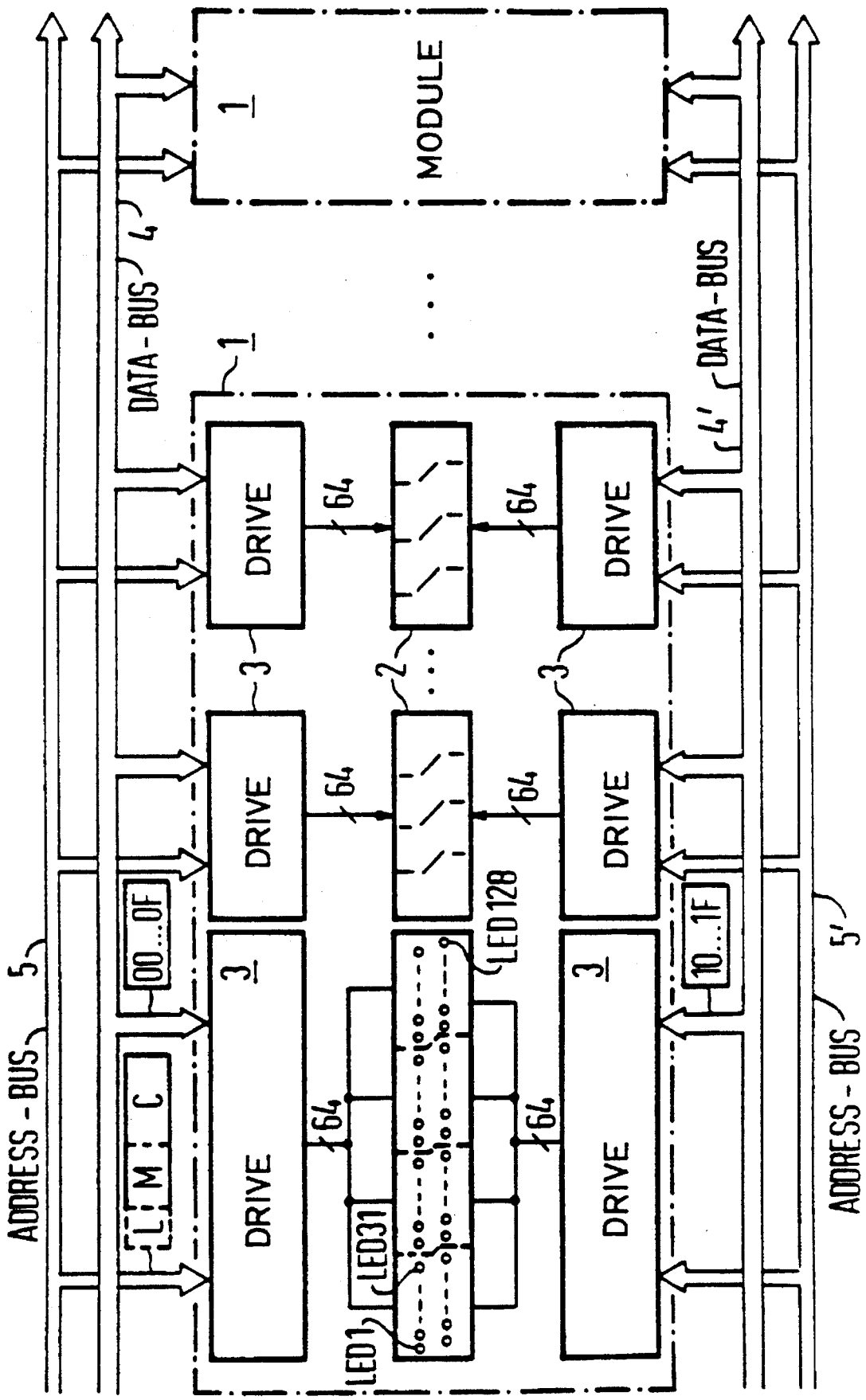
FIG. 3 shows in a block diagram the light-emitting diode strip constructed from a plurality of light-emitting diode chips, drive and driver chips associated with these light-emitting diode chips and a bus system for transferring addresses and, respectively, electronic data representing the printing information into the drive chips.
Figures 3A, 3B:
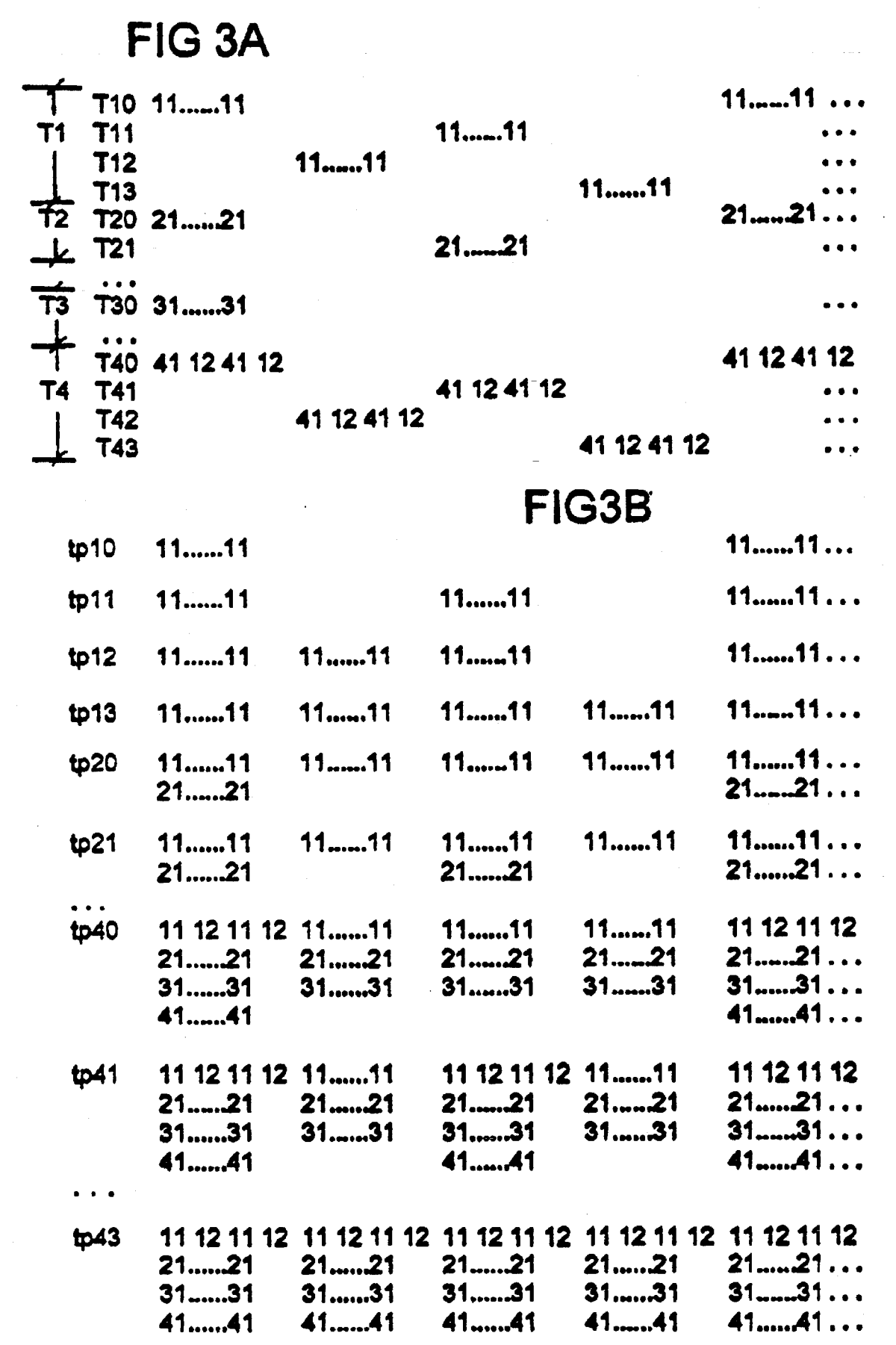

In order to illustrate the basic function of this light-emitting diode arrangement, FIG. 3A schematically depicts the function sequence for forming a microdot line in chronological sequence. Four successive print cycles T1 through T4 are shown below one another in FIG. 3A. According to the exemplary embodiment of FIG. 2, each of these print cycles is subdivided into four chronological sections or sub-cycles of equal length. For example, they are referenced T10, T11, T12 and T13 in the first printing cycle T1. The analogous case applies to the printing cycles following thereupon, for example printing cycle T4 having the sub-cycles T40 through T43. A diode group that is driven during a sub-cycle and whose LED elements are respectively individually activated as a function of supplied information is schematically shown in FIG. 3A in line direction in the form of a numerical sequence, for example "11 . . . 11". Analogous to FIG. 2, FIG. 3A shows only the beginning of a diode line, that is a printing line. Since the exemplary embodiment according to FIG. 2 proceeds on the basis of four diode groups and the schematic illustration of FIG. 3A contains five columns, the numerical sequences in the right-hand edge column already refer again to a repetition of the first diode group. In the practical embodiment, this is then continued (indicated by dots) in cyclical interchange of the individual groups. So that the illustration of FIG. 3 is not overloaded, the designations of the LED elements of the four diode groups of FIG. 2 have not been entered into this illustration. Rather, numerical sequences have been selected wherein the first digit correlates with the designation of the printing cycle, for example "1" correlates with T1. The second digit refers with "1" to odd-numbered or, respectively, refers with "2" to even-numbered light-emitting diodes or appertaining pixel elements. A corresponding, column-by-column allocation illustrates the various diode groups. In other words, the first as well as the fifth column of FIG. 3A refer to the first diode group having the light-emitting diodes LED1 through LED32 of FIG. 2; the second column refers to the second diode group having the light-emitting diodes LED33 through LED64; the third column refers to the third diode group having the light-emitting diodes LED65 through LED96; and the fourth column refers to the fourth diode group having the light-emitting diodes LED97 through LED128.

In its successive lines, FIG. 3A thus shows that the first diode group is initially driven during the first sub-cycle T10 of the first printing period T1, the third diode group is driven in the following second sub-cycle T11, the second diode group is driven in the following third sub-cycle T12 and, finally, the fourth diode group is driven in the fourth sub-cycle T13. A corresponding dot pattern is thus produced section-by-section on the photoconductive drum with corresponding geometric or topical offset as seen in the line direction.

This is in turn schematically shown in FIG. 3B. The illustration of FIG. 3B is to be understood such that it schematically reproduces the charge image on the photoconductive drum line-by-line for a respective specific point in time. Thus, tp10 references the point in time with which the first sub-cycle T10 of the first printing period T1 ends. At this point in time, the first diode groups having the light-emitting diodes LED1 through LED32 of the optical character generator have produced the dot pattern on the circumferential cylinder of the photoconductive drum that is shown in the first line of FIG. 3B. The references in FIGS. 3A and 3B have thereby been selected to coincide in order to produce the relationship between chronological and area-related presentation.

At point in time tp11, the charge images generated by the third diode group having the light-emitting diodes LED65 through LED96 are added to this print format of the line, These charge images are shown in the third column in FIG. 3B. This continues after the third sub-cycle T12, i.e. at the point in time tp12, with the charge images of the second diode group having the light-emitting diodes LED33 through LED64. Thus, at point in time tp13 after the end of the fourth sub-cycle T13, the light-emitting diode line has been filled insofar as a distinction is not to be made between light-emitting diodes arranged offset transversely relative to the line direction.

The illustration in FIGS. 3A as well as 3B then takes this arrangement of light-emitting diodes that lies mirror-inverted with respect to the above-described light-emitting diodes in the line direction of the optical character generator. Similar to conventional optical character generators, this arrangement is selected to achieve the desired raster width of the picture elements in line direction. That is, even-numbered pixel elements are generated with the light-emitting diode arrangement lying above an imaginary axis in FIG. 2 and the odd-numbered pixel elements are generated with the arrangement lying therebelow. Since the light-emitting diodes that generate neighboring even-numbered or odd-numbered pixel elements are topically offset by four raster widths R, the odd-numbered picture elements are generated time-offset during the fourth printing period T4.

The execution of a second and third printing periods T2, T3 is therefore also schematically indicated in FIG. 3A. The corresponding patterns are referenced here as "21 . . . 21" and "31 . . . 31" in order to produce the relationship between the second and third printing period T2, T3, respectively.

As shown correspondingly in line tp20 of FIG. 3B, the optical character generator already begins (in the first sub-cycle T20 of the second printing period T2) to produce the next pixel element line that is filled up section-by-section in the following sub-cycles analogous to the above-explained steps. This continues with a third printing line in the third printing period T3. Since the described procedures analogously sequence herein, this progressive build-up of the charge image is not shown in detail in FIG. 3B.

Finally, in the fourth printing period the topical offset between the light-emitting diodes that are allocated to the even-numbered or odd-numbered pixel elements is now synchronized to the motion of the photoconductive drum. This is indicated in FIG. 3A in the corresponding line for the sub-cycle T40 of the fourth printing period T4. The numerical group "41 12 41 12" is intended to illustrate that the light-emitting diodes allocated to the odd-numbered pixel elements in the respectively first diode groups already generate pixel elements of the fourth line of the charge image, whereas the light-emitting diodes for the even-numbered pixel elements are only generating the corresponding pixel elements in the first image line. This is schematically symbolized with "12" in this numerical group. This image formatting is then continued in the following sub-cycles T41 through T43 of the fourth printing period T4 until all even-numbered pixel elements of the first pixel element line have been transferred. FIG. 3B schematically illustrates this in the pixel element patterns for points in time tp40, tp41 and tp43. At this latter point in time, that is, with the conclusion of the fourth printing period T4, the first pixel element line has also been completely filled with the corresponding, even-numbered pixel elements. Before this, the light-emitting diodes allocated to the odd-numbered pixel elements have already generated the three next, following pixel element lines. This procedure is then cyclically continued in the described manner in order to successively generate the pixel element lines for a charge image on the rotating photoconductive drum.

FIG. 3 shows, in the form of a block diagram, the basic configuration of the optical character generator consisting of a light-emitting diode strip comprising a plurality of diode chips and the appropriate drive arrangement. The character generator is built up of a plurality of character generator modules 1 which are arranged end to end on the surface. All modules are structured in the same manner which is why the basic configuration of the modules is shown on only one example. The core of a character generator module 1 is a row of light-emitting diode chips 2, already explained in greater detail with reference to FIG. 2, with in each case a double-row arrangement of light-emitting diodes LED1 to LED128. For space reasons, each light-emitting diode row is associated with its own drive chip 3 which in this example has 64 output lines in order to be able to individually activate the 64 light-emitting diodes LED1, LED3 to LED127 and LED2, LED4 to LED128 respectively in dependence on the respective printing information.

This printing information is supplied in parallel via data bus lines 4, 4' to the drive chips 3. The width of these data bus lines is in each case 16 bits as indicated in FIG. 3 with data bits 00 to 0F and 10 to 1F, respectively. To transfer the printing information transmitted via the data bus lines 4, 4', the appropriate drive chips 3 are selected with the aid of an address transferred via address bus lines 5, 5'. The configuration of the address is indicated diagrammatically in FIG. 3. It contains a storage register address L, a module address M and a chip address C. In this connection, the storage register address L per se is not transferred via the address bus lines 5, 5' but formed internally within the drive chips 3. Diagrammatically considered, however, it comprises two address bits by means of which in each case one of four buffer registers can be selected for the parallel transfer of 16 data bits available on the corresponding data bus line 4 or 4', respectively. The total of 64 data bits correspond to the printing information for the upper and lower half, respectively, of a light-emitting diode chip 2. The chip address C comprises five address bits and thus allows up to 32 light-emitting diode chips 2 or their associated drive chips 3 to be selected within a character generator module 1. Via the module address M, finally, the appropriate character generator module is selected. The character generator can have up to eight character generator modules with three address bits.

The spatial arrangement of the drive chips 3 on both sides of the light-emitting diode chips 2 requires these addresses, particularly the storage register address L to be processed inverted in the lower half of the character generator. The drive chip 3 is switched over for this step via the least significant bit of the chip address C via fixed wiring on the character generator module. Details of this will be explained later.

FIG. 4 now shows a block diagram which diagrammatically explains the information flow, particularly for a drive chip 3. For reasons of clarity, the drive chip 3 in FIG. 4 is subdivided into a processing unit 31 and a sequential switching unit 32. The printing information is edited in a conventionally configured printer control 6 and supplied to the processing unit 31 via the data bus line 4. Corresponding to the basic structure of the character generator explained above, the processing unit 31 is essentially constructed of four part-circuits 33/0 . . . 33/3 which are connected in parallel with one another. Each part-circuit contains all elements in order to produce from the printing information 16 individual drive signals DS for 16 light-emitting diodes 16, which signals are supplied to a driver chip 34. The latter contains 64 driver circuits which in each case individually selectively activate one of the 64 associated light-emitting diodes LED1, LED3 to LED127 and, respectively, LED2, LED4 to LED128.

In this respect, it should first be basically noted here that the individual driving of each individual light-emitting diode of the optical character generator is necessary because of the high requirements for uniform printing quality on the one hand and because of different characteristics of the light-emitting diodes on the other hand. The requirement is for as uniform as possible a radiation energy of all light-emitting diodes. Since the radiation power of the light-emitting diodes is different, each light-emitting diode must be individually allocated a particular operating time during a write cycle. Apart from the temporal decoupling of the sequentially supplied printing information from the exposure of a microline of the photoconductor drum, which, in principle, must first be considered to be a parallel process, this is the main function of the part-circuits 33 of the processing unit 31.

To be able to fulfil this function within a predetermined time pattern, the part circuits 33 need a plurality of clock signals D-CLK, CY-CLK and I-CLK and a number of other control signals, essentially to be considered as sequence control signals, which are emitted by the switching unit 32 of the drive chip 3. In the switching unit 32, the totality of the output signals is essentially derived by means of an internal counter from input signals which are supplied to it from the printer control 6. These are essentially two clock signals, namely a data clock signal D-CLK and a cycle clock signal CY-CLK and other control signals which will be discussed in greater detail in conjunction with the detailed description of the switching unit 32. At this point, it will only be indicated that the switching unit 32 also decodes the address ADD, transferred from the printer control via the address bus line 5, by a comparison with an internally determined chip and module address C, MA. For reasons of clarity, the latter is indicated by the input lines of the switching unit 32 designated by the letters C and MA, respectively, in FIG. 4.

Finally, the switching unit 32 also contains control information needed for finely calibrating the operating point of the driver circuits of the driver chip 34. This control information transferred from the printer control 6 via the data bus line 4 into the processing unit 31 is output from there into the switching unit 32 via a 6-bit line 35.

Figure 5:
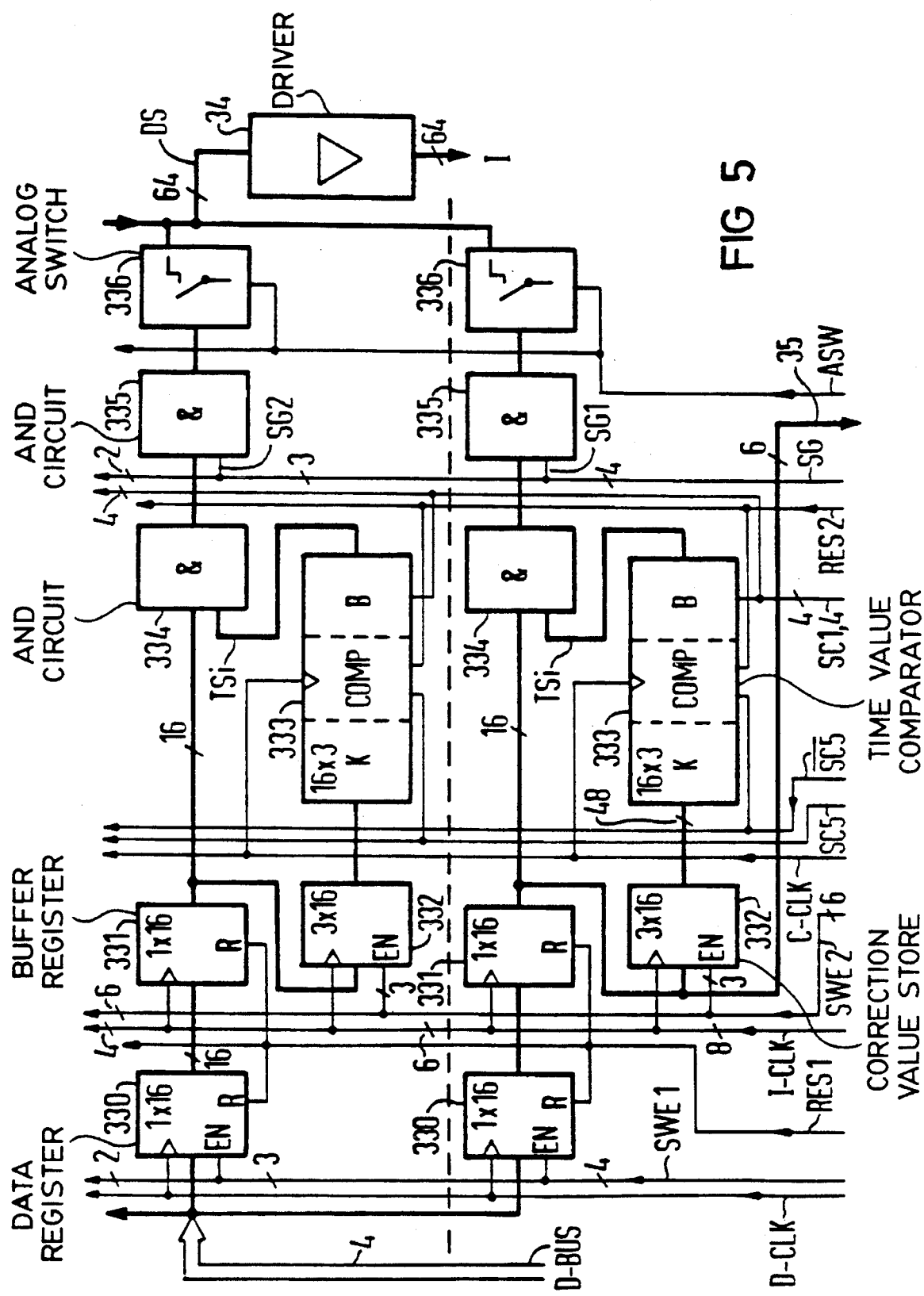
FIG. 5 shows a further detailed block diagram of two part-circuits of the processing unit.

FIG. 5 only shows, for reasons of clarity, two of the four part-circuits of the processing unit 31 in greater detail. Each part-circuit 31 transfers the printing information available on the data bus line 4 or 4' into a data register 330. The four data registers 330 of a processing unit 31 are selected by four individual write control signals SWE1, which are generated from address signals by the switching unit 32. The printing information is transferred into the data registers 330 with a transfer clock D-CLK which is also supplied via the switching unit 32. Each data register 330 is connected to a buffer register 331 by means of which the data transmission cycle is decoupled from the processing cycle of the drive chip. The printing information is transferred from the data register 330 into the associated buffer register 331 by means of in each case one internal clock signal I-CLK generated by the switching unit 32. The data registers 330 and the buffer registers 331 can be jointly reset via a reset signal RES1 into a defined state which is also generated by the switching unit 32.

The printing information in the buffer register 331 is logically combined bit by bit with a time value in order to individually control the duration of illumination of the light-emitting diodes. The individual duration of illumination of an individual light-emitting diode is assumed to be adjustable in steps into eight intervals where the minimum duration of illumination of the light-emitting diodes is assumed to represent a basic interval which can be expanded by seven stages of adjustment. If here a microline period T is defined as the period of time which is available overall for writing one microline, it is assumed that one half microline period is available as maximum on time $T_{GATE}$ of the individual drivers of the driver chip 34. The duration of illumination of a light-emitting diode is then determined on the basis of relation 1:

$$T_{ON} = T_{GATE}\left(\frac{35}{64} + \frac{K}{16}\right) \quad (1)$$

where K is an individual integral correction value between 0 and 7. It can be expressed by three bit positions in binary coding. To store 16 individual correction values in each of the part-circuits 33 of the processing unit 16, one correction value store 332 is provided in each case. The determination of the correction values on the basis of the individual luminous power of the light-emitting diode does not form any part of the present invention. It is therefore sufficient to explain here that this is done with the inclusion of the printer control 6 by measuring the instantaneous power of each light-emitting diode at fixed test times. The correction values determined during this process are transferred from the printer control 6 as data information via the data bus line 4, 4' into the associated drive chips 3. To transfer new correction values from the buffer registers 331, the correction value store 332 is individually enabled via further write control signals SWE2 generated by the switching unit 32. The correction value store 332 is connected to a time value comparator 333. It is indicated in the representation of FIG. 5 that this comparator compares 3-bit correction values K with a corresponding time base value B in order to generate interval signals TS which define the duration of illumination $T_{ON}$ of the associated light-emitting diodes.

Figure 6:
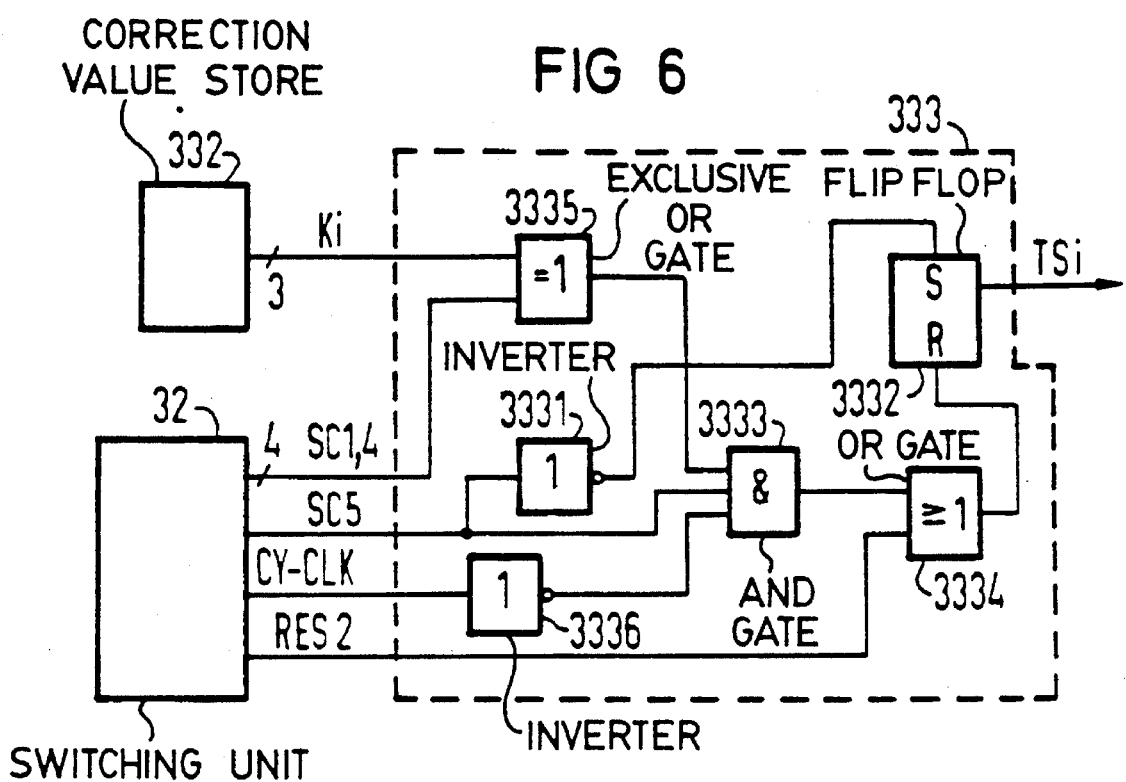
FIG. 6 shows the circuit diagram of a time value comparator for generating the individual on times of the light-emitting diodes, this time value comparator forming a module within a part-circuit of the processing unit according to FIG. 5.

FIG. 6 shows an embodiment of the time value comparator in the form of a part-circuit for processing a correction value. The correction value store 332 is indicated from which an individual correction value Ki is supplied to this part-circuit of the time value comparator 333. The switching unit 32 indicated supplies the necessary sequence control signals. The function of these signals is illustrated in a timing diagram of FIG. 7. The actual reference quantity for the operation of the time value comparator 333 is the cycle clock signal CY-CLK which is divided down into sequence control signals SC1 to SC4 by an internal synchronous binary counter in the switching unit 32. These first sequence control signals are indicated simplified as SC1,4 in FIG. 6. These result in the time base value B of the time value comparator 333. A further sequence control signal SC5 controls the on and off mode, respectively, of the time value comparator 333.

The part-circuits of the time value comparator 333 are generally switched on at the beginning of a write cycle by the resetting of the second sequence control signal SC5 which is supplied inverted via a first inverter 3331 to the set input of a flipflop 3332. This then outputs the individual interval signal TSi until it receives a reset signal at its reset input. Two reset conditions are supplied to the reset input of the flipflop 3332 via an OR gate 3334. The switching unit 32 generates a reset signal RES2 which resets the flipflop 3332 into a defined initial state at the beginning of a processing cycle in the event of a fault.

In the normal operating condition, the reset condition for the flipflop 3332 is generated by an AND gate 3333. As is shown by a comparison with FIG. 7, the AND gate 3333 is disabled in each case by the reset second sequence control signal SC5 until time t70. It is only from this time on that the flipflop 3332 can be reset in dependence on the individual correction value Ki supplied. For this purpose, the output of an exclusive OR circuit 3335 is connected to a further input of the AND gate 3333. This combinatorial element is supplied with the first sequence control signals SC1 to SC4 on the one hand, and the individual correction value Ki on the other hand. The condition of combination is to be expressly understood in this case in such a manner that the starting condition with high signal level is met whenever the sum of the input signals results in a logical "1" due to a binary combination.

Assuming, for example, an individual correction value of decimal "0", the duration of illumination $T_{ON}$ of the associated individual light-emitting diode should correspond to the basic interval in accordance with the relation (1) explained above. Expressed in binary values, the individual correction value Ki then corresponds to the bit sequence "000". At time t70, the sum of the input signals of the exclusive OR circuit 3335 is thus "0" as can also be seen from FIG. 7. At time t71, the maximum-frequency first sequence control signal SC1 changes its signal state. This fulfils the condition of combination for the exclusive OR gate 3335. The AND gate 3333 is also supplied with the inverted cycle clock signal CY-CLK via a further inverter 3336 which is why it conducts with the falling edge of the cycle clock until time t72. As indicated in FIG. 7 by the reference symbol "0" at the interval signal TSi, the basic interval is thus terminated at time t72.

If, in contrast, the individual correction value Ki corresponds to the value "2", expressed in decimal values, the corresponding bit sequence is "010". This bit sequence is present from time t73 with respect to the low-frequency first sequence control signals SC4, SC3 and SC2. At time t74, the maximum-frequency first sequence control signal SC1 again changes its signal state so that the AND gate 3333 conducts for one clock period at time t75 with the next inverted cycle clock signal CY-CLK and resets the flipflop 3332. This occurs in similar form for all other correction values. Even with the highest correction value Ki=7, the interval signal TSi is reset at time t76 at the latest, shortly before the maximum on time for the associated driver circuit has elapsed at time t77.

Figure 7:
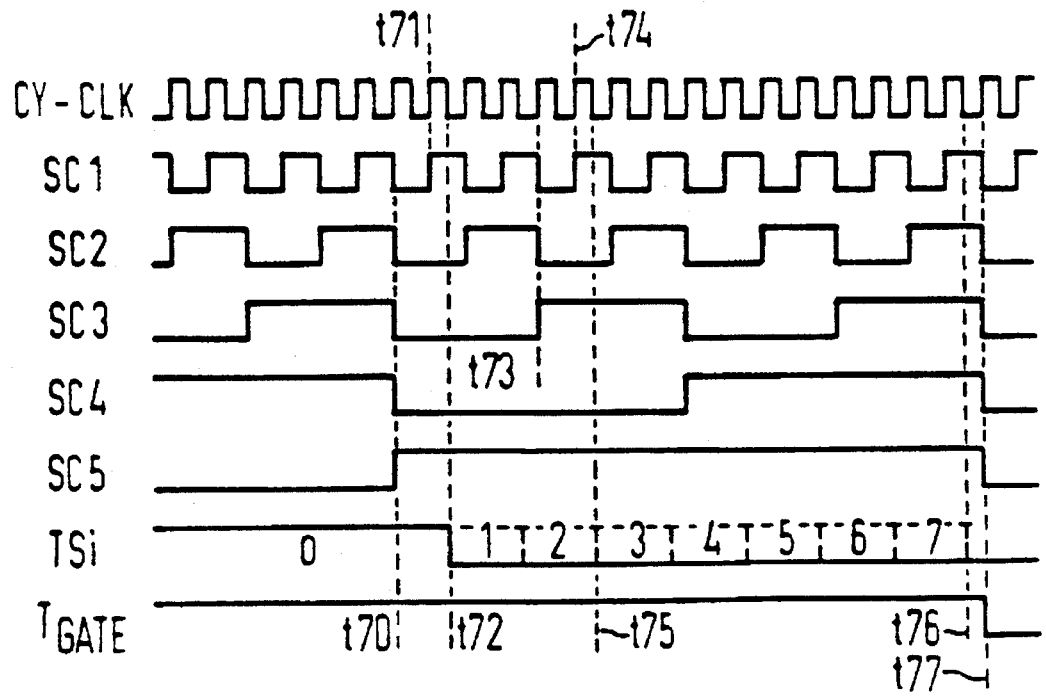
FIG. 7 shows timing diagrams for explaining the operation of the time value comparator according to FIG. 6.

After this explanation of the configuration and the operation of the time value comparator 333 with reference to FIGS. 6 and 7, it can be assumed that the operation of the AND circuits 334 (FIG. 5) which are connected, on the one hand, to the associated buffer register 331 and to the appropriate time value comparator 333, respectively, is understandable by itself. The AND circuit 334 contains 16 AND gates for combining in each case one of the individual interval signals TSi with one of the output signals of the buffer register 331 so that the printing information is logically combined with the individual duration of illumination of a light-emitting diode.

A further similarly constructed AND circuit 335 is connected to the AND circuit 334 which is constructed of 16 AND gates having in each case two inputs. The first inputs are in each case connected to corresponding outputs of the AND circuit 334. The second inputs are supplied in parallel with a switching signal SG which determines the maximum on time of the driver circuits of the driver chip 34 in the timing pattern. The pulse shape of this switching signal for one of the AND circuits 335 is already shown in the timing diagram $T_{GATE}$ of the last line of FIG. 7.

Finally, an analog switch 336 serving in each case 16 switching elements is provided between the driver chip 34 and the further AND circuit 335 in each part-circuit 33 of the processing unit 31. Each of the 16 inputs, connected to one of the outputs of the AND circuit 335, of the analog switch 336 forms a control input for one of the switching elements which are connected at the output via parallel lines to the driver chip 34. The controlled inputs of the switching elements are supplied in parallel with an analog signal ASW which is generated by the switching unit 32.

The level of this analog signal can be used for finely calibrating the operating point of all driver circuits of the driver chip 34 as will still be explained in detail. Initially, it should only be noted here that this fine calibration is effected on the basis of an adjustment value which is supplied to the switching unit 32 via a 6-bit-wide data line 35 which is also connected to the output of the buffer register 331 of one of the part-circuits 33 of the processing unit 31. This adjustment value can thus be supplied in a loading cycle from the printer control 6 via the data bus 4 or 4', respectively. It should also be added that all part-circuits 33 of the processing unit 31 are identiclaly constructed apart from the fact that only one of the part-circuits additionally exhibits this data signal line connection 35.

Figure 8:
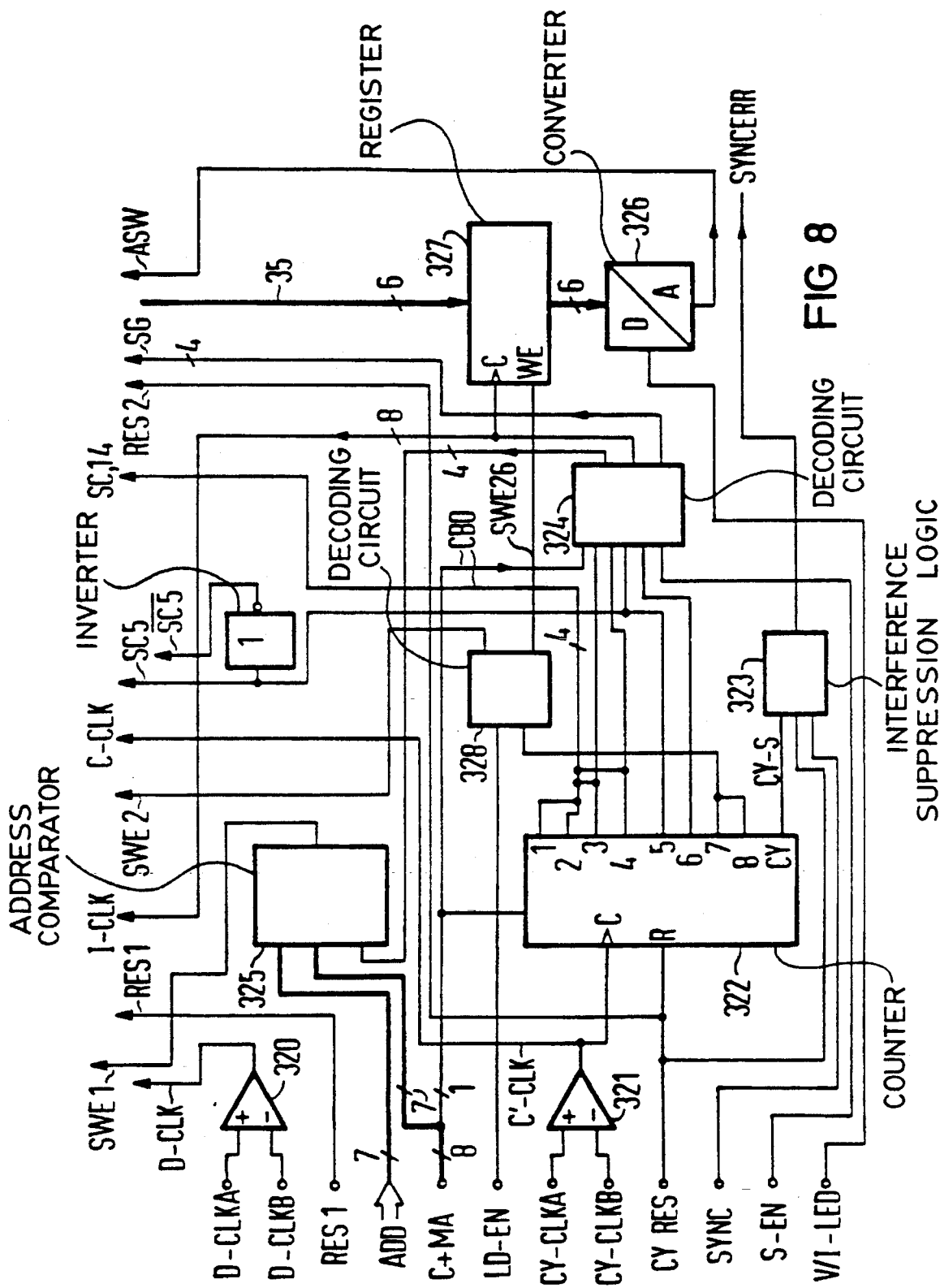
FIG. 8 shows a more detailed block diagram of the switching unit of the drive chip.

FIG. 8 shows the configuration of the switching unit 32 of the drive chip 3 of FIG. 4 in greater detail in a block diagram. It has already been shown there that the switching unit 32 is supplied with the data clock signal D-CLK and the cycle clock signal CY-CLK as clock signals from the printer control 6. Specifically, these clock signals are received in the switching unit 32 as symmetrical signals D-CLKA and D-CLKB and CY-CLKA and CY-CLKB by receiving amplifiers 320 and 321 respectively. The difference signal of the respective clock signals is evaluated in these amplifier stages which eliminate possible disturbances due to their high common-mode suppression and input hysteresis.

The significance of the data clock signal D-CLK, that is to say of the output signal of one of the receiving amplifiers 320 as transfer clock signal for the data registers 330 has already been explained. One function of the cycle clock signal CY-CLK as the time base for obtaining the interval signals TSi has also been explained already in conjunction with the description of the time value comparator 333, particularly with reference to FIG. 6. In addition, the cycle clock signal is the essential clock signal for the write cycle from which all timed processing steps are derived in the drive chip 3. Thus, it is used as clock signal for an internal synchronous binary counter 322 in the switching unit 32. This 8-bit counter controls with its output signals the processing of the printing information transferred into the drive chip 3 via the data bus 4. All binary counters 322 of the individual drive chips 32 must operate synchronously for error-free processing of this information. This is ensured by an interference suppression logic 323 which supervises the respective counters for their synchronous running in the counting cycle (count 0 to 255).

Figure 9:
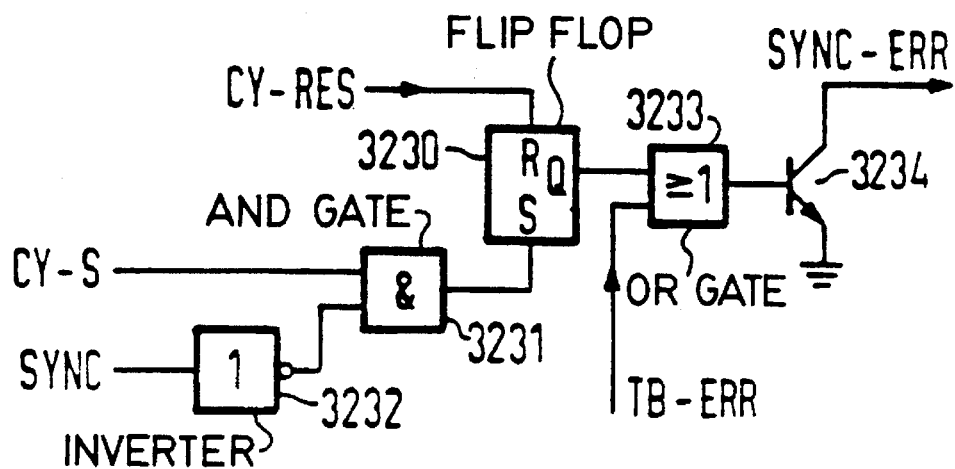
FIG. 9 shows a circuit diagram for a noise suppression logic which is contained in the switching unit and is used for synchronizing the switching units of the optical character generator with one another.

A detailed circuit of the interference suppression logic 323 is shown in FIG. 9. A supervision flipflop 3230 is set into a defined initial state by means of a reset signal CY-RES which is supplied by the printer control 6. To ensure the synchronous running of all binary counters 322 in the optical character generator, the printer control 6 outputs a synchronization signal SYNC at the end of one processing cycle. This signal is evaluated in the interference suppression logic 323 with respect to whether it occurs at the same time as a carry signal CY-S which is output by the individual binary counters 322 at their carry output CY. For this purpose, a further AND gate 3231 is provided which is supplied with the carry signal CY-S and the sychronization signal SYNC inverted via an inverter 3232. If the time condition for the carry signal CY-S and the synchronization signal SYNC is met, the AND gate 3231 remains disabled. If, however, the carry signal CY-S of the binary counter 322 occurs with a time offset, this AND gate 3231 is activated. Since it is connected to the set input of the supervision flipflop 3230, the supervision flipflop 3230 is then set. Its output signal controls via an OR gate 3233 a transistor 3234 with open collector output to conduct so that it outputs a synchronization error signal SYNC-ERR. The error signal TB-ERR supplied to a further input of the OR gate is explained later in conjunction with FIG. 15.

FIG. 9 does not show any longer that these output signals of the interference suppression logic circuits 323 are combined hardwire in an OR gate and are fed back to the printer control 6. If one of the binary counters 322 lacks synchronicity, the printer control 6 aborts the processing cycle and resets all drive chips to a defined initial state via the cycle reset signal CY-RES.

Returning to FIG. 8, the essential control processes triggered by the binary counter 322 will now be described. It appears appropriate for reasons of clarity and for better understanding, to represent the basic switching function of the switching unit 32 in summary, initially without detail sequences.

In the embodiment described, the basic function of the drive chip 3 consists of converting the serially provided printing information into individual driver currents I for 64 light-emitting diodes LED of the associated light-emitting diode chip 2. It was already explained with reference to the relation (1) that the maximum on time $T_{GATE}$ for the driver circuits in the driver chip 34 is half a microline period T.

Accordingly, the other half of a processing cycle is available for the serial transfer of the printing information, referred to a light-emitting diode block having a total of 16 light-emitting diodes, for example LED1, LED3, . . . LED31. In this illustrative embodiment, a time window which is one quarter of the microline period T is defined for each part-circuit 33 of the processing unit 31 in order to transfer the printing information controlled by the address. One microline period T corresponds to 64 periods of the cycle clock signal CY-CLK and this time window is thus 16 cycle clock periods long. In this time interval, all part-circuits 33/0, 33/1, 33/2 and 33/3 corresponding to one another of a character generator module 1 can then be serially selected on the basis of the chip address for transferring the printing information. If then, in addition, the frequency of the data clock signal D-CLK is n times the cycle clock signal CY-CLK, mutually corresponding part-circuits 33 of n different character generator modules 1 can be selected within one cycle clock period, using the module address M.

The basic structure of a light-emitting diode chip 2 has already been explained with reference to FIG. 2. The area offset of the four light-emitting diode blocks of 16 light-emitting diodes each, for example LED1, LED3, ... LED31 corresponds to the subdivision of the processing unit 31 into four part-circuits 33/0, 33/1, 33/2 and 33/3, respectively, which are in each case associated with one light-emitting diode block. In this illustrative embodiment, the geometric arrangement of the light-emitting diodes and the use of several similar part-circuits 33 provides the possibility of four write cycles proceeding temporally staggered for generating one microline.

This basic operation of a switching unit 32 is illustrated with reference to the timing diagrams shown in FIG. 10, referred to a single drive chip 3. The cycle clock signal CY-CLK forms the time base for one microline period T. The binary counter 322 described divides this clock signal down and in doing so forms the sequence control signals SC1 to SC6 of FIG. 10. From the logical combination of the sequence control signals SC5 and SC6, the switching signals SG0 to SG3 are formed which define the maximum on time of the driver stages in the associated driver chip 34. As is shown in FIG. 10, these switching signals are in the "1" state in each case for one half microline period T. These on-time intervals are temporally staggered. The sum of driver currents I in the light-emitting diode chip 2 is thus approximately constant in the temporal mean so that a predetermined value is not exceeded.

As soon as one of the part-circuits 33 has converted the previously received printing information into drive signals DS for the driver chip 34, it is again available for transferring printing information for the next-following microline. The transfer period is defined by one of the four time window signals EN0 to EN3 which immediately follow the on time of the associated switching signals SG0 to SG3 for a period of T/4.

The switching operation of the switching unit 32 explained is achieved by means of the binary counter 322 in conjunction with a first decoding circuit 324 as is shown in FIG. 8. This circuit receives the sequence control signals SC3, SC4 and SC5 and SC6 from the binary counter.

In addition, it is supplied with the least-significant bit CB0 of the chip address C on a hardwired signal line. This input signal has a special significance. FIG. 3 was used to explain the light-emitting diode chips 2 with a double-row arrangement of the individual light-emitting diodes, for example LED1, LED3 to LED127 or LED2, LED4 to LED128, respectively. These two light-emitting diode rows are associated with an own drive chip 3 each in a mirror-image arrangement. Because of the mirror symmetry, the drive chips 3 of one light-emitting diode row must process addresses in a normal way but the drive chips 3 of the other light-emitting diode row must process addresses for the data registers 330 and the AND circuits 335 as inverted signals. This switching-over is performed in the drive chip via the least-significant address bit CB0 of the chip address C.

More specifically, the optical character generator compensates for the arrangement of the control means (drive chips 3) that is mirror-symmetrical with respect to the light-emitting diode means (diode chip 2), and for achieving a reversed sequence of temporally staggered timing control signals in respective control means arranged on different sides of a respective light-emitting diode means. Each of the switching units 32 of each of the control means has a binary counter 322 which can be switched over in the direction of counting wherein the binary counters 322 are operated in mutually mirror-symmetrically opposite control means with opposite counting directions and respective output signals are inverted with respect to one another. The decoding device has a decoder 3240 for generating time window signals EN0–EN3 and a multiplexer 3242 having 2-to-1 multiplexer stages. In each control means the binary counter and the multiplexer receive a hardwired change-over signal CB0, which is a least significant bit of the associated module and diode means address received from the printer control, for controlling counting direction of the binary counter and forming a selection signal of the multiplexer, respectively. Outputs of the binary counter are connected in pairs to inputs of the multiplexer in cyclical interchange. Mutually corresponding temporally staggered timing control signals supplied to respective part-circuits (33/0 ... 33/3) as write control signals (SWE1, SWE2) and as internal clock signals, respectively, occur temporally in a reversed order in control means which are mirror-symmetrically arranged with respect to each other.

A further input signal of the first decoding circuit 324 is an enable signal S-EN supplied from the printer control 6. All driver circuits of the optical character generator can be switched on in parallel with the reset state of this signal or conversely switched off with the set state.

Figure 11:
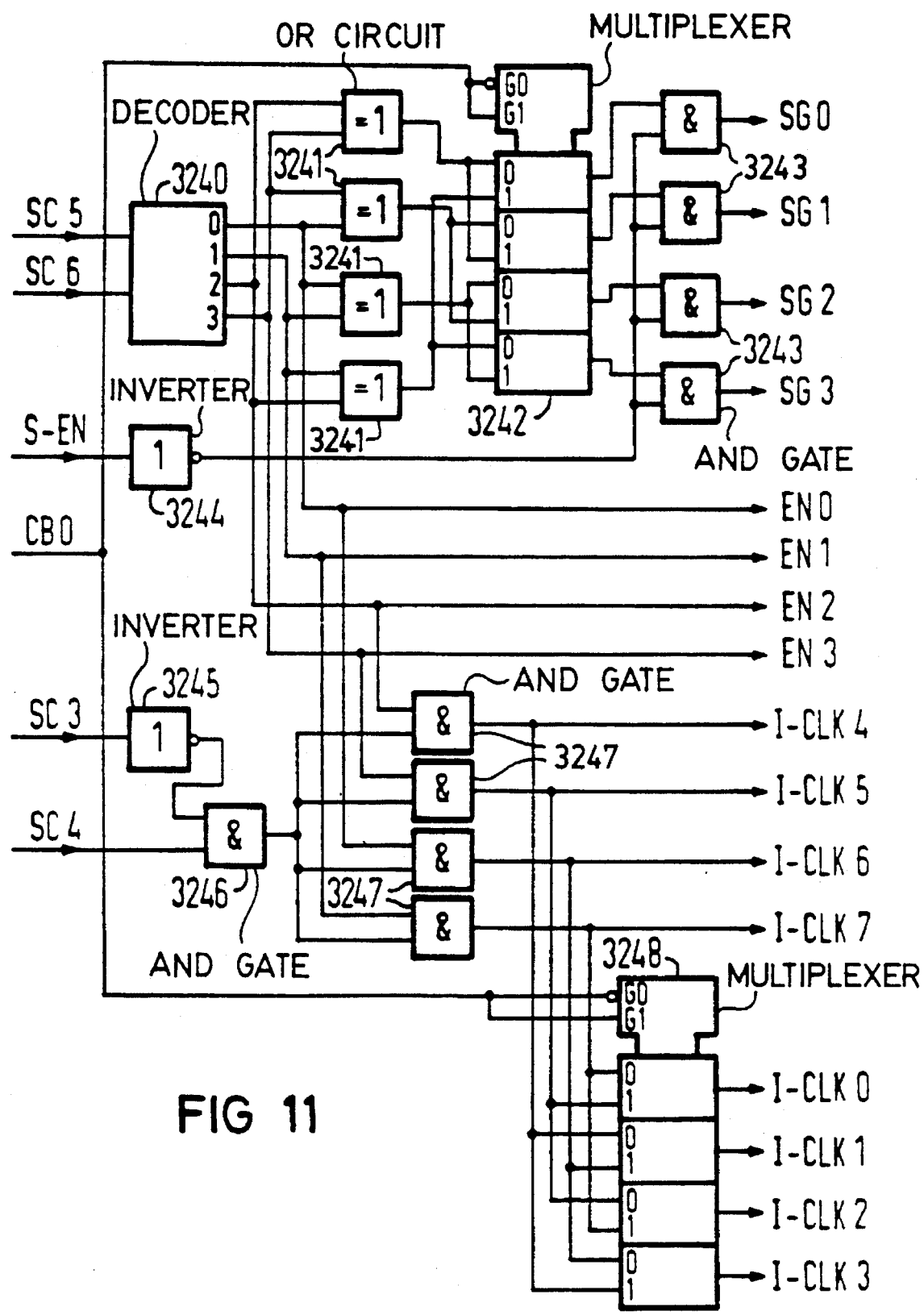
FIG. 11 shows a detailed circuit diagram of a first decoding circuit of the switching unit for generating sequence control signals shown in FIG. 10.

Details of the first decoding circuit 324 are shown in a block diagram of FIG. 11. A first decoder 3240 is supplied with the sequence control signals SC5 and SC6 in order to derive from this signal combination the four time window signals EN0 to EN3 the pulse variations of which are shown in FIG. 10. These time window signals are supplied combined in pairs to one of four OR circuits 3241 which are connected to a multiplexer chip 3242. This multiplexer chip consists of four 2-to-1 multiplexer stages. Their first inputs 0 are selected when the least-significant bit CB0 of the chip address is in the "0" signal state. The inputs 1 of the multiplexer chip 3242 are connected through when the CB0 bit is in the "1" state. Each of the four stages of the multiplexer chip 3242 is connected to one of four AND gates 3243 with one input. The second inputs of these AND gates receive the enable signal S-EN inverted via an inverter 3244. The output signals of these AND gates 3243 form the switching signals SG0 to SG3 with the pulse shapes shown in FIG. 10.

Figure 12:
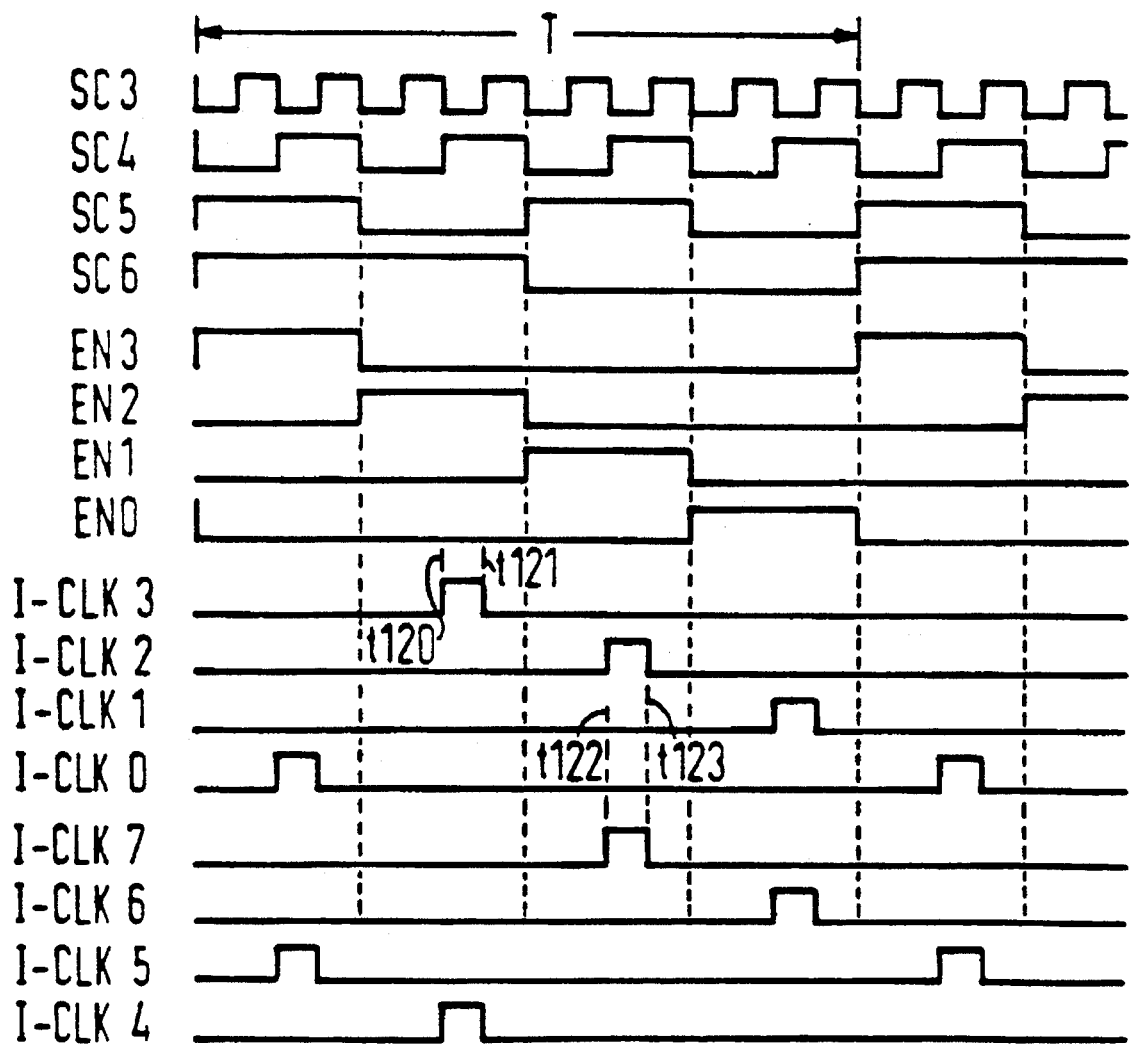
FIG. 12 shows a number of further timing diagrams in which the temporal variation of time window signals and internal clock signals, derived from these, is shown for explaining the circuit diagram of FIG. 11.

In addition, the first decoding circuit 324 generates with the aid of the time window signals EN0 to EN3 further control signals, hitherto generally called internal clock signals I-CLK. In detail, these are clock signals I-CLK0 to I-CLK3 for the buffer registers 331 and clock signals I-CLK4 to I-CLK7 for the correction value stores 332 the time characteristic of which is illustrated in FIG. 12.

In this figure, the sequence control signals SC3 to SC6 are again shown. As explained, the time window signals EN0 to EN3 are derived from the two sequence control signals SC5 and SC6. This defines the time frame for transferring the printing information into the data registers 330. If the fourth part-circuit 33/3 of the processing unit 31 of the drive chip 3 is considered as an example, the associated time window signal EN3 defines the transfer of the entire printing information into the corresponding data register 330 in the first quarter of the microline period T. In the subsequent second quarter of the microline period, the printing information can then be transferred into the following buffer register 331. The transfer time is defined by the transfer clock signal I-CLK3 which is activated for a period T/16. FIG. 12 shows in greater detail that the rising edge of the transfer clock signal ICLK3 occurs during the activated state of the time window signal EN2 at time t120 when the third sequence control signal SC3 is reset and at the same time the fourth sequence control signal SC4 assumes the "1" signal state. The falling edge of this transfer clock signal at time t121 then coincides with the subsequent change in state of the third sequence control signal SC3.

The circuit implementation is also shown in FIG. 11. A further AND gate 3246 is supplied inverted via a further inverter 3245 with the third sequence control signal SC3 and directly with the sequence control signal SC4. The AND gate 3246 is connected in parallel to first inputs of four further AND gates 3247, to the second inputs of which in each case one of the time window signals EN0, EN1, EN2 and EN3, respectively, is applied. These AND gates in each case output one of the internal clock signals I-CLK4 to I-CLK7. Finally, a second multiplexer chip 3248 is provided which is constructed like the first multiplexer chip 3242 and is also switched over by the least-significant bit CB0 of the chip address C. The wiring of the outputs of the AND gates 3247 to the inputs of the individual multiplexer stages of the multiplexer chip 3248 is mandatorily obtained from preceding explanations for the time conditions of the transfer clock signals I-CLK0 to I-CLK3 for the buffer registers 331. As is shown in FIG. 12, transfer clock signals corresponding to one another, that is to say associated with the same part-circuits 33, for example I-CLK3 and I-CLK7 for the buffer registers 331 or the correction value stores 332 are temporally offset with respect to one another by T/4 in each case. When the transfer clock signal I-CLK3 is activated between t120 and t121, the transfer clock signal I-CLK7 occurs between the times t122 and t123.

Thus, the first decoding circuit 324 described supplies, using the time base supplied by the binary counter 322, the essential switching signals for decoupling the data transfer from the processing of the transferred data and the obtaining of the actual drive signals DS for the light-emitting diode drivers of the driver chip 34.

So that the transfer of the printing information into the data registers 330 of the individual part-circuits 33 only occurs during the defined time window, an address comparator 325 is provided in the switching unit 32 in accordance with FIG. 8. It receives the time window signals EN0 to EN3 as control signals and also the address signals ADD transferred via the address bus lines 5, 5'. The module address M and the chip address C are defined with respect to ground potential by hardwiring. On non-wired connections, the "1" signal state automatically occurs. This is diagrammatically indicated in FIG. 8 by the signal lines associated with the address comparator 325 and designated by C+MA.

Figure 13:
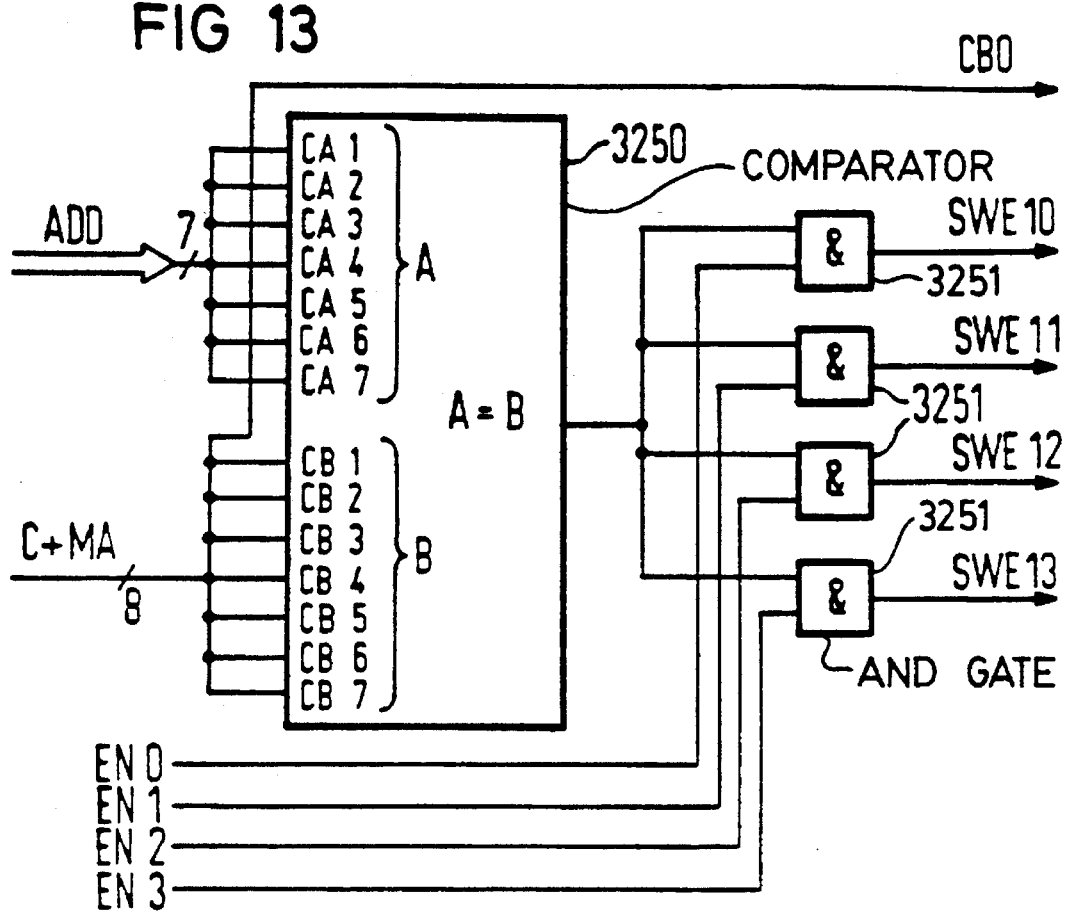
FIG. 13 shows a circuit diagram of an address comparator provided in the switching unit for generating write control signals for the part-circuits of the processing unit.

A detailed circuit diagram of the address comparator 325 is shown in FIG. 13. A comparator chip 3250 is supplied on seven first signal inputs with the address ADD transferred from the printer control 6. As specified above, seven second inputs are hardwired for forming the chip address, the least-significant address bit CB0 being brought out. The comparator chip 3250 compares these two addresses supplied and outputs a positive output signal in the case of equality. This signal is supplied in parallel to first inputs of four further AND gates 3251 the second inputs of which in each case receive one of the time window signals EN0 to EN3. The AND gates in each case generate one of the first write control signals SWE10, SWE11, SWE12 and SWE13, respectively. Each of these signals enables one of the data registers 320 for data transfer.

The dispersion of the mean values of the total currents due to production tolerances in the various driver chips 34 is to be eliminated—as mentioned—by fine calibration of the analog control signal ASW of the driver stages. For this purpose, the switching unit 32 shown in FIG. 8 contains a programmable digital/analog converter 326 which is supplied with the control voltage V/I LED transferred from the printer control 6. The digital/analog converter 326 is associated with a 6-bit register 327 for storing the digital value for the fine calibration. To transfer this chip-individual calibration value, this register is connected via the data signal line 35 to the outputs of the buffer register 331 of the fourth part-circuit 33 of the processing unit 31. The stored calibration value is used for correcting the supplied control voltage V/I-LED in the digital/analog converter 326 and is supplied as analog signal ASW to the analog switches 336 of the processing unit 31.

In the text above, it was essentially the operation of the switching unit 32 and of the processing unit 31 during write cycles, during which printing information is converted into drive signals DS for the driver chips 34, which was discussed. In this process, correction information which is both chip-related and individual for each driven light-emitting diode is processed. This information, which is stored in the register 327 for the fine calibration value or in the correction value stores 332, however, is not permanently stored in the drive chip 3 but can be determined again and again by the printer control 6 on the basis of the global or individual measurements during test routines in order to take into consideration ageing processes.

Apart from the normal write cycles described, loading cycles for storing changed correction values in the correction value stores 332 or of updated chip-related adjustment values in the register 327 must therefore be provided. In principle, these loading processes proceed similarly, with respect to their temporal interleaving, to the processing cycles described in detail above. However, this applies with just one restriction: the printing information comprises, referred to the individual light-emitting diode LED, only one bit, but the correction value K which is individual for each driven light-emitting diode consists of three bits. In addition, the updated information for loading the register 327 for the fine calibration value must also be transferred in a loading cycle.

The addressing arrangements for the data transmission of the updated correction values or adjustment values are also used in the loading cycle. The temporal staggering of the loading processes is also arranged in the same manner in write and loading cycles. This makes it immediately understandable that a loading cycle is composed of four successive loading sequences in order to transfer and to load into the respective registers successively the three bit positions of the individual correction values for each of the light-emitting diodes driven and, finally, the chip-related adjustment values.

The duration of a loading sequence is identical with the microline period T, that is to say defined with the length of a write cycle. During each loading sequence, the transfer processes also occurring during a write cycle, of the information offered via the data bus lines 4, 4' into the data registers 330 and subsequently into the buffer registers 331 are also performed with the processing of the addresses transferred via the address bus lines 5, 5' and the control signals supplied by the switching units 32 of the drive chips 3. To this extent, there is no difference per se in comparison with a write cycle. A repeated consideration of the respective individual processes is therefore unnecessary.

In the text which follows, it will therefore only be differences with respect to the sequences in a write cycle which will be discussed. Loading cycles are initiated by the printer control 6 by a loading control signal LD-EN transferred to the switching unit 32 as is shown in FIG. 4 and FIG. 8, respectively. In FIG. 8, this loading control signal LD-EN is supplied to a second decoding circuit 328 which controls the processes during a loading cycle. This decoding circuit is connected to higher-significance outputs of the binary counter 322 and thus receives third sequence control signals SC7 and SC8, respectively. Output signals of the second decoding circuit 328 are the second write control signals SWE2 which enable the correction value stores 332 for the bit-by-bit writing-in of correction values K or the register 327 for the fine calibration value for writing-in a new adjustment value via the data signal lines 35.

In the text which follows, the control operation of the second decoding circuit 328 is explained in greater detail with reference to the detailed circuit diagram of FIG. 14. The two third sequence control signals SC7, SC8 output by the binary counter 322 are converted in a second decoder 3281 into four window signals LD SQ0 to LD SQ3 for the successive loading sequences of a loading cycle, which are in each case one microline period T long. Within one loading sequence, therefore, all the processes which are sequence-controlled by the first decoder circuit 324 as explained with reference to FIGS. 11 and 12 can therefore occur temporally staggered.

These window signals of the loading sequences must now be converted into the second write control signals SWE2 by means of which in each case one of the three registers of the correction value stores 332 is prepared for data transfer. For this purpose, a further multiplexer chip 3282 having seven 2-to-1 multiplexer stages is provided. This chip is activated via the loading control signal LD-EN and receives as switching control signal the least significant bit DB0 of the chip address, the function of which has already been explained. Six stages of this multiplexer chip in each case output one of the second write control signals SWE2, in detail SWE20 to SWE25.

Figure 14:
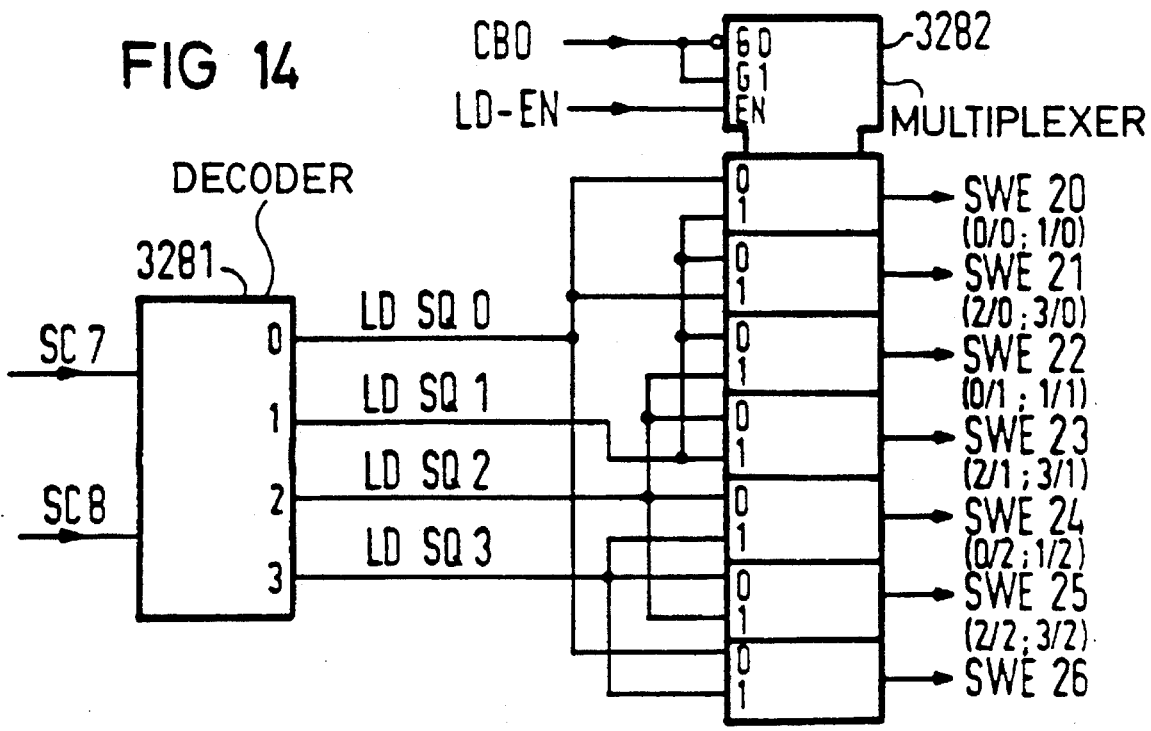
FIG. 14 shows a circuit diagram of a second decoding circuit for generating further write control signals in a load cycle in which updated correction values for the individual on times of the light-emitting diodes are transferred into the individual part-circuits of the processing units.

FIG. 14 diagrammatically shows the functional association of each individual one of these second write control signals with the individual register stages of the correction value stores 332. According to FIG. 4, each processing unit 31 contains four part-circuits 33/0 to 33/3, FIG. 5 shows in greater detail that each part-circuit exhibits a correction value store 332 having in each case three 16-bit registers. This is what the respective functional information for the second write control signals SWE20 to SWE25 in FIG. 14 is related to. For example, the write control signal SWE20 is the preparation signal for in each case the first register of the correction value stores 332 of the part-circuits 33/0 or 33/1. Analogously, the write control signal SWE21 is the preparation signal for the corresponding registers of the correction value stores 332 of the part-circuits 33/2 or 33/3, respectively. Considering the case that the least significant bit CB0 of the chip address C is "0", the wiring of the input side of the further multiplexer chip 3282 shows that the write control signal SWE20 corresponds in time to the window signal LD SQ0 of the first loading sequence whilst the second write control signal SWE21, which is also mentioned, must be allocated in time to the next-following loading sequence identified by the window signal LD SQ1.

This functionally means that in the assumed case (CB0="0"), during the first two loading sequences, the correction value stores 332 of the four part-circuits 33/0 to 33/3 are prepared in order to accept into the in each case first registers the first bit of changed correction values K. The data transfer itself is controlled, temporally staggered, by means of the first decoding circuit with the aid of the individual transfer clock signals I-CLK4 to I-CLK7 as has already been explained in greater detail with reference to FIGS. 11 and 12.

Analogously to this, it can be derived from FIG. 14 that the further second write control signals SWE22 and SWE23 prepare the second registers of the correction value stores 332 for data transfer. In this arrangement, the write control signal SWE22 corresponds in time to the second window signal LD SQ1 of the second loading sequence whilst the write control signal SWE23 is derived from the window signal LD SQ2 of the third loading sequence.

Similarly, the further second write control signals SWE24 and SWE25 prepare the third registers of the correction value stores 332 for data transfer. They correspond in time to the window signals LD SQ2 and LD SQ3 of the third and fourth loading sequence, respectively. From the window signal LD SQ3 of the fourth loading sequence, finally, the third write control signal SWE3 is also derived which prepares the register 327 for the fine calibration value for data transfer. The actual data transfer into the individual registers is in each case controlled by separate transfer clock signals, particularly I-CLK4 to I-CLK7. Their generation has already been explained in detail in conjunction with the description of the first decoding circuit 324 with reference to FIGS. 11 and 12, respectively, so that a repetition here is not necessary.

The illustrative embodiment described above illustrates one possible embodiment of the invention but a plurality of other developments are conceivable within the context of this invention. Such a possibility will be discussed here in detail in the text which follows. In the illustrative embodiment described above, all internal processing processes in the drive chips 3 during one processing cycle are controlled by the cycle clock signal CY-CLK generated by the printer control 6. If the processes directly relating to the driving of the light-emitting diodes LED are now separated in time from the remaining processing processes in the drive chips 3, a further degree of freedom is obtained for designing the drive to the light-emitting diodes LED.

In further development of the illustrative embodiment described, the operation of which could be called a synchronous operation, the printer control 6 can be designed, for example, in such a manner that it supplies, in addition to the cycle clock signals CY-CLK, a further clock signal sequence TB-CLK which is asynchronous to the former and which, called time base clock signal sequence, controls the operation of the time value comparator 333 whilst retaining the principles described. The relation (1) described for the duration of illumination $T_{ON}$ of a light-emitting diode then assumes the form according to relation (2):

$$T_{ON} = \frac{32}{f_{TB-CLK}} \cdot \left( \frac{35}{64} + \frac{k}{16} \right)$$

where $f_{TB-CLK}$ is the frequency of this time base clock signal sequence and for the latter the following holds as a further constraint, that the maximum on time $T_{GATE}$ of the individual drivers of the driver chip 34 is to satisfy the condition $$T_{GATE} \geq \frac{32}{f_{TB-CLK}}$$

This additional clock signal can be used, detached from the time conditions for processing the printing information for a microline, for defining the individual on time of the light-emitting diodes LED which is called asynchronous operation. Operating points can be set in the linear area of their current/light power characteristic via the choice of frequency of this time base clock signal sequence TB-CLK with shorter maximum on times $T_{ON}$ of the driver stages for the light-emitting diodes LED. Thus, the operation of the optical character generator is much more independent of the characteristic of light-emitting diodes used.

An illustrative embodiment of a circuit arrangement for deriving the interval signals TSi from the additional time base clock signal sequence TB-CLK is shown in FIG. 15. It is assumed here that this clock signal sequence, like the cycle reset signal CY-RES, is supplied by the printer control 6. As a further drive signal, the second sequence control signal SC5 generated by the switching unit 32 is used the operation of which has been explained in greater detail in conjunction with the description of the timing diagrams of FIG. 7. Essentially, this sequence control signal SC5 defines within the course of one processing cycle the time at which the drive intervals of the light-emitting diodes LED are to begin group by group.

To implement this function two state flipflops 500 and 1501, respectively, are provided. The second sequence control signal SC5 is supplied to the clock inputs of both flipflops. Their outputs are connected to an enable input EN or a clear input of a five-stage synchronous counter 1502 which is clock controlled with the time base clock signal sequence TB-CLK.

This clock pulse sequence is asynchronous with the time characteristic of the second sequence control signal SC5. This is why the positive-going edge of the second sequence control signal SC5 is used first for setting the two state flipflops 1500 and 1501, respectively. This activates the synchronous counter 1502 via the output signal of the first state flipflop 1500. It is then reset in all counting stages with the next clock pulse due to the output signal of the second state flipflop 1501. Output signals TB1 to TB4, MOD of the five counting stages of the synchronous counter thus have the low level which is detected via an AND gate with inverted inputs which thus operates as zero decoder 1503. Its output signal is supplied to a further AND gate 1504 which is also supplied with the time base clock signals via a further inverter 1505. The output of this further AND gate 1504, which switches through with the negative-going edge of the clock pulse, is connected to a bit generator 1506. It derives from this static output signal a bit pulse which is inverted by means of a further inverter 1507 and is supplied via a further OR gate 1508 to the reset input of the second state flipflop 1501. This flipflop 1501 is thus reset again and the clear function is satisfied.

The synchronous counter 1502 is counted up with the subsequent positive-going edges of the further clock signal sequence TB-CLK until a carry signal CARRY is output at a carry output CRY with the rear edge of the thirty-first counting pulse. This sets a further flipflop 1509 the output of which is connected to a further bit generator 1510 and a further inverter 1511. This inverter 1511 thus outputs, derived from the carry signal CARRY of the synchronous counter 1502, an output signal which is supplied as reset signal via the OR gate 1508 to the second state flipflop 1501 and directly to the reset input of the first state flipflop 1500. The synchronous counter 1502 is deactivated with the resetting of the first state flipflop 1500. It remains to add that the second sequence control signal SC5 is additionally supplied to a further bit generator 1512 with connected inverter 1513 which, in turn, is connected to the reset input of the further flipflop 1509. This flipflop is thus newly set with each carry signal CARRY.

For the purpose of error supervision, this drive circuit for the asynchronous operation exhibits a further supervision flipflop 1514. This supervises the proper operation of the synchronous counter 1502. It is reset into a defined initial state with the cycle reset signal CY-RES before each processing cycle. The enable signal supplied to the synchronous counter 1502 is provided to the D-type input of the supervision flipflop via a further inverter 1516. Thus, a high-level signal is present at this input for as long as the synchronous counter 1502 is activated. If the first state flipflop 1500 is reset, triggered by the carry signal CARRY of the synchronous counter 1502, the signal state also changes at the D-type input of the supervision flipflop. If then a positive-going edge of the second sequence control signal SC5 occurs before this change of state at the D-type input of the supervision flipflop 1514, an error signal TB-ERR is generated at the output of the supervision flipflop which indicates that the synchronous counter 1502 is operating erroneously. This error signal is fed via the OR gate 3233 into the interference suppression logic shown in FIG. 9 and already described, with the consequence explained there.

For better understanding, the time value comparator 333, already explained with reference to FIG. 6, and one of the correction value stores 332 is finally also shown in FIG. 15. This makes it clear that with the four least significant output signals TB1 to TB4 of the synchronous counter 1502, sequence control signals for the time value comparator 333 are now provided asynchronously to the timing pattern of the processing cycle, the function of which sequence control signals is comparable to the first sequence control signals SC1 to SC4 explained in greater detail in connection with the description of FIG. 6. The output signal MOD of the fifth counting stage of the synchronous counter 1502 is supplied via the inverter 3331 and the AND gate 3333, respectively, to the set or reset input of the flipflop 3332 which, in turn, outputs functionally comparable interval signals TSi. Details of this can be seen in the description for FIG. 6 so that a repetition here is unnecessary.

Furthermore, each of the four part-circuits 33/0 to 33/3 of the processing unit 31 exhibits—as described—a time value comparator 333. Because of the temporal staggering of the on and off mode of these four time value comparators 333, the drive circuit described for asynchronous operation must be provided twice. The drive circuit must be allocated—as described before—to the time value comparators of the part-circuits 33/1 and 33/3. A similarly constructed drive circuit is driven with the inverted second sequence control signal SC5 and is associated with the time value comparators 333 of the part-circuits 33/0 and 33/2.

It may be expedient to construct the drive chip 3 in such a manner that the drive chips 34 can be alternatively connected synchronously or asynchronously with respect to the processing cycle. In this case, further multiplexer chips would have to be provided which selectively supply the time value comparators with the first sequence control signals SC1 to SC4 and the second sequence control signal SC5 or with the output signals TB1 to TB4, MOD of one of the synchronous counters 1502, respectively. This provides the possibility of using the optical character generator described for a series of similar electro photographic printers having different printing capacity. In the case of devices with a low printing capacity, asynchronous operation will be preferred in order to increase the operating point of the light-emitting diodes. In the case of high-speed printers, the operation point of the light-emitting diodes is already high per se so that synchronous operation is to be preferred in this case.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. An optical character generator of an electro photographic printer for generating a charge image on a revolving charge storage drum, the charge image being composed of micro-image lines each generated continuously during one printing cycle, the optical character generator receiving printing information that is transmitted over a bus system by a printer control, the bus system operatively connecting the printer control to the optical character generator, comprising:

a plurality of character generator modules arranged in a row, each of the modules having a plurality $i$ of light-emitting diode means for emitting light, each of the light-emitting diode means having a plurality of light-emitting diodes arranged in k rows extending in a longitudinal direction where k is a finite whole number greater than one, light-emitting diodes of a respective row of said k rows having a predetermined offset in said longitudinal direction with respect to light-emitting diodes of other rows of said k rows;

the light-emitting diodes of each light-emitting diode means being subdivided along the longitudinal direction into n multi-row light-emitting diode groups where n is a finite whole number greater than one, the diode groups being distributed without overlap in a direction parallel to said longitudinal direction and being geometrically offset with respect to one another in a direction lateral to said longitudinal direction of the rows of light-emitting diodes;

each of the character generator modules further having a plurality of k×i control means for controlling the light-emitting diodes, each of the control means of the plurality of k×i control means having inputs connected to the bus system for selectively receiving printing information serially supplied by the printer control and having parallel outputs respectively connected to light-emitting diodes of a respective row of the k rows of the light-emitting diode means;

each of the control means of the plurality of k×i control means having a processing unit for converting the received printing information into n groups of drive control signals for selectively activating the light-emitting diodes and a switching unit, each said processing unit having n part-circuits associated respectively with the n multi-row light-emitting diode groups, each part-circuit of the n part-circuits of each processing unit of each of the control means of the plurality of k×i control means respectively generating from said printing information a respective one of the n groups of drive control signals such that the n groups of drive control signals, for compensating for said offset of each of the multi-row light-emitting diode groups, are temporally staggered with respect to each other;

each said processing unit further having driver means connected to respective part-circuits of the n part-circuits for receiving the n groups of drive control signals from the respective part-circuits of the n part-circuits associated therewith and for outputting individual drive signals to the light-emitting diodes connected to the respective control means of the plurality of k×i control means;

the switching unit of each of the control means of the plurality of k×i control means being connected to the respective n part-circuits and generating timing control signals that are temporally staggered and input to the respective n part-circuits to effect said temporal staggering of the drive control signals;

wherein staggering of the drive control signals occurs in a predetermined timing pattern of the printing cycle and is dependent on the respective offset of an associated light-emitting diode group, so that a straight micro-image line, which is linearly assembled section by section, is generated on the charge storage drum.

2. The optical character generator according to claim 1, wherein the printer control also outputs module and diode means addresses, and a plurality of printer control signals to the optical character generator, said plurality of control signals having at least a data clock, and wherein the bus system has a data bus for supplying the printing information and an address bus for simultaneous transmission of an associated module and diode means address of the respective light-emitting diode means and the plurality of printer control signals, and wherein each of the control means has a device for decoding the associated module and diode means address and outputting a decoded address, and has data registers connected to the data bus that are enabled by the decoded address provided by the device for decoding and controlled by the data clock, and has buffer registers connected to the data registers, for decoupling transmission of the printing information from internal processing of the printing information in each of the control means.

3. The optical character generator according to claim 2, wherein a respective predetermined associated module and diodes means address is hardwired in each control means and wherein the device for decoding is an address comparator connected to the address bus which compares an associated module and diode means address transmitted simultaneously on the data bus and address bus with the predetermined associated module and diode means address, the address comparator having an output operatively connected to each of the n part-circuits in the respective control means.

4. The optical character generator according to claim 3, wherein the plurality of printer control signals include a cycle clock signal, and wherein the temporally staggered timing control signals include write control signals, wherein said switching unit of each of said control means has an internal clock generator which is controlled by the cycle clock signal supplied from the printer control, wherein said switching unit of each of said control means has at least one decoding device for forming the write control signals in accordance with the n part-circuits, the write control signals being provided n times and temporally offset with respect to one another by an nth part of a period of a printing cycle and having a predetermined period duration, the write control signals being provided by the switching unit to the n part-circuits in the associated processing unit.

5. The optical character generator according to claim 4, wherein the internal clock generator of each switching unit is a multi-stage binary counter that forms a modulo-2 frequency divider that is reset into a defined initial state via a reset signal, the reset signal being one of the plurality of printer control signals, and is controlled by the cycle clock signal and wherein the binary counter outputs at respective binary stages thereof sequence control signals, the sequence control signals having different pulse rates, each of the sequence control signals being reduced with respect to the cycle clock signal at a predetermined ratio and wherein the binary counter is connected to the at least one decoding device which derives, from a combination of two of the sequence control signals having a pulse period corresponding to one period of the printing cycle and one half of the printing cycle, respectively, time window signals which cyclically subdivide each period of the printing cycle into n equal and successive time intervals, said time window signals being provided to said address comparator in the associated switching unit.

6. The optical character generator according to claim 4, wherein for compensating for an arrangement of the control means that is mirror-symmetrical with respect to the light-emitting diode means, and for achieving a reversed sequence of temporally staggered timing control signals in respective control means arranged on different sides of a respective light-emitting diode means, each of the switching units of each of said control means has a binary counter which can be switched over in the direction of counting wherein the binary counters are operated in mutually mirror-symmetrically opposite control means with opposite counting directions and respective output signals are inverted with respect to one another, wherein the decoding device has a decoder for generating time window signals and a multiplexer having 2-to-1 multiplexer stages, wherein in each control means the binary counter and the multiplexer receive a hardwired change-over signal, which is a least significant bit of the associated module and diode means address received from the printer control, for controlling counting direction of the binary counter and forming a selection signal of the multiplexer, respectively, and wherein outputs of the binary counter are connected in pairs to inputs of the multiplexer in cyclical interchange, and wherein mutually corresponding temporally staggered timing control signals supplied to respective part-circuits as write control signals and as internal clock signals, respectively, occur temporally in a reversed order in control means which are mirror-symmetrically arranged with respect to each other.

7. The optical character generator according to claim 4, wherein the printer control signals include a synchronization signal and a reset signal, and wherein for synchronizing the control means, the internal clock generator is a binary counter having a carry output, wherein the switching unit has an interference suppression logic having one input connected to the carry output and also having another input which is supplied with the synchronization signal output by the printer control, wherein the interference suppression logic has a logic network for evaluating an occurrence of a carry signal on the carry output and of the synchronization signal, respectively, which logic network for an advance of the carry signal, outputs an error signal to the printer control and wherein the interference suppression logic has a reset input, which is supplied with the reset signal also generated by the printer control, for resetting the interference suppression logic to a defined initial state.

8. The optical character generator according to claim 4, wherein each part-circuit of each of the processing units has a respective data register and associated buffer register, and an interval control means for outputting for each light-emitting diode an individual interval signal which determines an "on" time interval, and has an AND circuit, one input of the AND circuit being connected to an output of the associated buffer register and another input of the AND circuit being connected to an output of the interval control means and an output of the AND circuit connected to a respective input of an associated driver means.

9. The optical character generator according to claim 8, wherein the temporally staggered timing control signals include sequence control signals and an internal clock signal, and wherein each interval control means has a correction value store connected to an associated time value comparator, wherein the time value comparator provides a time base interval derived from the sequence control signals and wherein in the correction value store a respective correction value for each light-emitting diode is stored which defines a correction interval for extending the time base interval, each "on" time duration being a multiple of a period of the internal clock signal.

10. The optical character generator according to claim 9, wherein the temporally staggered timing control signals further include a state signal, and wherein the correction value store has for each correction value a storage space having a bit capacity which contains the correction interval in multiples of the period of the cycle clock signal in binary coding up to a predetermined maximum length, wherein the time value comparator is constructed of a plurality of comparator part-circuits corresponding in number to a number of associated light-emitting diodes, wherein each said comparator part-circuit has an RS flipflop, which is set by a state signal having a period duration of a length of a predetermined maximum "on" time of the light-emitting diodes and that outputs the interval signal, an exclusive OR circuit having inputs connected in parallel to outputs of the storage space of the correction value store and having a further input for receiving the sequence control signals that have a period duration of integral fractions of the maximum on time of the light-emitting diodes and having an output connected to a reset input of the RS flipflop.

11. The optical character generator according to claim 9, wherein the switching unit has means for deriving from the interval clock signal the time base interval for the time value comparators, and wherein the switching unit has a binary counter that supplies first sequence control signals and a further second sequence control signal as respective output signals of five low-significance counting stages thereof to each of the time value comparators in each of the n part-circuit of each of the processing units, and wherein the first and second sequence control signals cause the time value comparators to be driven synchronously to the printing cycle.

12. The optical character generator according to claim 11, wherein the plurality of printer control signals further includes a second cycle clock signal, that is asynchronous to the cycle clock signal and that has a pulse rate at least as high as the pulse rate of said cycle clock signal, and wherein the switching unit has a synchronous counter which is controlled by the second cycle clock signal and wherein the synchronous counter, an on-mode and off-mode of which is controlled by the second sequence control signal, outputs on outputs of counting stages thereof further sequence control signals which are supplied to one of the time value comparators and thus control the one of the time value comparators asynchronously to the printing cycle.

13. The optical character generator according to claim 12, wherein the optical character generator further comprises a state flipflop for defining the on-mode and off-mode of the synchronous counter, said state flipflop being set by the second sequence control signal and being reset by a carry signal output by the further synchronous counter, and the state flipflop having an output connected to an enable input of the further synchronous counter.

14. The optical character generator according to claim 13, further comprising a second state flipflop for setting a defined initial state of the synchronous counter, said second state flipflop having a set input that receives the second sequence control signal, having an output connected to a clear input of the further synchronous counter and a decoding network for determining the reset states of all counting stages of the further synchronous counter and having an output connected to a reset input of said second state flipflop.

15. The optical character generator according to claim 19, wherein the temporally staggered timing control signals have second write control signals and the plurality of printer control signals have a load control signal, and wherein the correction value store of the interval control means is connected to parallel outputs of the associated buffer register of the respective part-circuit for bit-by-bit loading of updated correction values which are transferred into the control means in a loading cycle, and wherein the respective interval control means has an enable input which is supplied, for enabling the bit-by-bit transfer of the correction values, with one of second write control signals, which are generated in the switching unit, when the load control signal output by the printer control is received by the switching unit, and wherein the switching unit has a decode circuit that receives the load control signal and in response thereto outputs the second write control signals to the processing unit.

16. The optical character generator according to claim 15, wherein in the switching unit, assuming m-digit correction values wherein m is a finite whole number greater than one, having the decoding circuit for generating the second write control signals, the decoding circuit has a decoder which is supplied with the sequence control signals having a period corresponding to a multiple of a clock cycle period for defining m successive loading sequences identified by window signals and the decoder having a multiplexer, which is supplied with the load control signal as an enable signal and with a change-over signal as selection signal and which has a plurality of 2-to-1 multiplexer stages to inputs of which output signals of the decoder are supplied in pairs and cyclically interchanged, the multiplexer stages outputting a respective one of the second write control signals, each individual correction value store of the part-circuits thereby being prepared for storing correction values bit-by-bit in dependence on the change-over signal in mutually reversed time sequences.

17. The optical character generator according to claim 8, wherein the plurality of printer control signals has a control voltage, and wherein the switching unit of each control means, for calibration of driver currents in the associated driver means, has an alignment device which is supplied with the control voltage output by the printer control and which corrects the control voltage with a fine calibration value which is individual for the associated driver means and outputs an analog signal, and wherein an analog switch is connected between the AND circuit and parallel inputs of the associated driver means in each part-circuit of the processing unit of the respective control means, control inputs of the analog switches being supplied in parallel with the analog signal, each of the analog switches having a further input connected to an output of a respective AND circuit and having an output connected to an input of the driver means.

* * * * *